US006963753B1

(12) United States Patent
Hamabe

(10) Patent No.: US 6,963,753 B1
(45) Date of Patent: Nov. 8, 2005

(54) TRANSMISSION POWER CONTROL METHOD AND TRANSMISSION POWER CONTROL APPARATUS IN MOBILE COMMUNICATION SYSTEM

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/830,785

(22) PCT Filed: Nov. 2, 1999

(86) PCT No.: PCT/JP99/06086

§ 371 (c)(1),
(2), (4) Date: May 1, 2001

(87) PCT Pub. No.: WO00/27050

PCT Pub. Date: May 11, 2000

(30) Foreign Application Priority Data

Nov. 2, 1998 (JP) ................................ 10-311833

(51) Int. Cl.[7] ............................ H04B 7/00; H04Q 7/20
(52) U.S. Cl. ........................ 455/522; 455/524; 455/69; 370/278; 370/329
(58) Field of Search ................................ 455/522, 524, 455/517, 516, 500, 501, 507, 67.11, 69, 442, 455/453; 370/278, 329, 342, 441

(56) References Cited

U.S. PATENT DOCUMENTS 5,727,033 A * 3/1998 Weaver et al. .............. 375/358
6,154,659 A * 11/2000 Jalali et al. ................. 455/522
6,212,364 B1 * 4/2001 Park ............................ 455/69
6,396,867 B1 * 5/2002 Tiedemann et al. ......... 375/141
6,434,124 B1 * 8/2002 Rege .......................... 370/311
6,487,174 B1 * 11/2002 Mizuguchi et al. ......... 370/252
6,487,191 B1 * 11/2002 Kang et al. ................. 370/342
6,587,447 B1 * 7/2003 Wang et al. ................ 370/335
2003/0186653 A1 * 10/2003 Mohebbi et al. ......... 455/67.11

FOREIGN PATENT DOCUMENTS

EP 0 853 393 A1 * 6/1996
JP 7-30482 1/1995

(Continued)

OTHER PUBLICATIONS

K. Higuchi, et al., "Experiments on Adaptive Transmit Power Control Using Outer Loop for W-CDMA Mobile Radio", Technical Report of IEICE, SSE98-18, RCS98-18 (Apr. 1998), pp. 51-57.

*Primary Examiner*—Nick Corsaro
*Assistant Examiner*—Edan Orgad
(74) *Attorney, Agent, or Firm*—Dickstein, Shapiro, Morin & Oshinsky, LLP.

(57) ABSTRACT

This invention relates to a transmission power control method and transmission power control apparatus in a mobile communication system. The reception quality of a signal (31, 32*a*, 32*b*, 41, or 42) transmitted from another mobile station (51 or 52) or base station (21 or 22) is compared with a predetermined control target value such as a signal-to-interference ratio. The comparison result is used for transmission power control on a remote station. If a frame error is detected in a transmitted signal, the control target value is increased by SIRinc. If no frame error is detected, the control target value is decreased by SIRdec. As SIRdec, the product of a target value of a frame error rate and SIRinc is set. With this operation, when a propagation environment such as multibus or moving speed changes, the control target value for transmission power control is changed within a short period of time, and channel quality is maintained constant, thus realizing desired channel quality.

98 Claims, 8 Drawing Sheets

FOREIGN PATENT DOCUMENTS

| | | |
|---|---|---|
| JP | 7-336291 | 12/1995 |
| JP | 8-181653 | 7/1996 |
| JP | 8-237220 | 9/1996 |
| JP | 9-186649 | 7/1997 |
| JP | 9-233022 | 9/1997 |
| JP | 9-261170 | 10/1997 |
| JP | 9-312609 | 12/1997 |
| WO | 97/50197 | 12/1997 |

* cited by examiner

TRANSMISSION POWER CONTROL METHOD AND TRANSMISSION POWER CONTROL APPARATUS IN MOBILE COMMUNICATION SYSTEM

TECHNICAL FIELD

The present invention relates to a transmission power control method and transmission power control apparatus in a mobile communication system which can obtain a high frequency utilization efficiency in various propagation environments and, more particularly, to a transmission power control method of controlling transmission power to bring channel quality near target channel quality, a transmission power control apparatus for implementing the method, and a mobile station, base station, and control station used in a mobile communication system.

BACKGROUND ART

In a code division multiple access mobile communication system, since many channels use the same frequency, the reception power of a signal on a given channel becomes interference wave power that interferes with other channels. On an upstream channel through which a mobile station transmits a signal and a base station receives it, when the ratio of signal power to interference wave power becomes high and excessive reception quality is set, the interference wave power increases. As a consequence, the channel capacity decreases. In order to prevent this, the transmission power on the mobile station must be strictly controlled. Transmission power control on an upstream channel is performed in the following manner. A base station measures reception quality based on a signal-to-interference ratio or the like, and compares it with a control target value. If the reception quality is higher than the control target value, the base station transmits a control instruction to decrease the transmission power to the mobile station. If the reception quality is lower than the control target value, the base station transmits a control instruction to increase the transmission power to the mobile station. The mobile station then increases/decreases the transmission power in accordance with the control instruction. This transmission power control method is disclosed in detail in U.S. Pat. No. 5,056,109 (Gilhousen et al., "Method and apparatus for controlling transmission power in a CDMA cellular mobile telephone system").

On a downstream channel as well, a high channel capacity is realized by performing transmission power control to set reception quality based on a signal-to-interference ratio or the like to a predetermined control target value. In transmission power control on a downstream channel, a mobile station measures the reception quality of the downstream channel, and compares it with a control target value. If the reception quality is higher than the control target value, the mobile station transmits a control instruction to decrease the transmission power to the base station. If the reception quality is lower than the control target value, the mobile station transmits a control instruction to increase the transmission power to the base station. The base station then increases/decreases the transmission power in accordance with the control instruction.

In an actual propagation environment for a mobile communication system, since mobile stations differ in their multipath effects and moving speeds, if a constant control target value is set for the above transmission power control on upstream and downstream channels, channel quality based on a bit error rate, frame error rate, or the like cannot be kept constant. If a large control target value is uniformly set to satisfy predetermined channel quality in mobile stations in any conditions, the set control target value is unnecessarily large for many mobile stations. As a consequence, the transmission power becomes unnecessarily high accordingly to increase interference wave power that interferes with other channels, resulting in a reduction in channel capacity. Optimal control target values that can minimize an increase in interference wave power and obtain a predetermined channel quality differ from mobile station to mobile station.

As a method of controlling a control target value to an optimal value, a technique called an outer loop is available, which changes a control target value in accordance with channel quality. When a frame error rate is to be used as channel quality, an error detection code is set in each frame, and a frame in which an error is detected by this code is determined as an error. A control target value is changed to set the frame error rate to a predetermined channel quality target value.

A specific method for this operation is described in Higuchi, Ando, Okawa, Sawabashi, and Adachi, "Experimental Study on Adaptive Transmission Power Control Using Outer Loop in W-CDMA" (Technical Report of IEICE, RCS98-18 (1998-04), pp. 51–57). As described in this reference, if the frame error rate in a predetermined time is higher than a target frame error rate, the control target value is increased by a predetermined amount, whereas if the frame error rate in the predetermined time is lower than the target frame error rate, the control target value is decreased by the same predetermined amount. The frame error rate in a predetermined time is obtained by counting the number of frames determined as errors for each predetermined number of frames and dividing the number of frames determined as errors by a predetermined number.

Assume that, in this method, a low frame error rate is set as a channel quality target value, and a control target value is changed by using the frame error rate in a predetermined time which is obtained from a small number of frames. In this case, even with the same channel quality, since the frame error rate in the predetermined time varies, a control target value is often set apart from an optimal value. Assume that in order to prevent this, the control target value is changed by obtaining a frame error rate within the predetermined time from many frames. In this case, when the optimal control target value changes, it takes much time to change the control target value in accordance with this change. Assume that the moving speed abruptly changes, the optimal control target value increases, and many frame errors are caused. Even in this case, the control target value cannot be increased until a predetermined number of frames are received, and the frame error rate in the predetermined time is calculated. As a consequence, the state where many frame errors are caused will continue. In contrast to this, if the optimal control target value decreases, the control target value cannot be decreased until a predetermined number of frames are received. As a consequence, the state where the transmission power is unnecessarily high will continue, resulting in a reduction in channel capacity.

Another problem in this conventional method is that the frame error rate greatly varies over time. In a constant propagation environment, even if the frame error rate is fixed to an ideal control target value as a channel quality target value, the frame error rate within a short time unit varies depending on the number of frame errors caused in the time. According to the conventional method, however, even if a propagation environment such as a moving speed is constant, since a control target value is repeatedly increased and decreased, the frame error rate within a short time unit greatly varies as compared with a case where a control target value is fixed to an ideal control target value. This is because, when the control target value is set to be larger than an optimal value, the frame error rate becomes lower than the channel quality target value, whereas when the control target value is set to lower than the optimal value, the frame error rate becomes higher than the channel quality target value.

When voice and image are to be transmitted in real time, even the frame error rate in a short time unit must be suppressed to be equal to or lower than a predetermined value because the quality of the voice and image deteriorates if frame errors concentrate. Therefore, a large channel quality target value must be set to make the frame error rate fall within a predetermined value while the frame error rate increases. As the control target value is increased, the transmission power increases, resulting in a reduction in channel capacity.

DISCLOSURE OF INVENTION

The present invention has been made in consideration of the above situation in the prior art, and has as its object to provide a transmission power control method in a mobile communication system, which can keep channel quality constant by quickly changing a control target value when a propagation environment based on multipath transmission and the like or moving speed changes, and realize desired channel quality, and a transmission power control apparatus for implementing the transmission power control method.

It is another object of the present invention to provide a transmission power control method in a mobile communication system, which can increase channel capacity by suppressing variations in frame error rate in each short time unit and reducing transmission power by setting a low control target value, and a transmission power control apparatus for implementing the transmission power control method.

It is still another object of the present invention to provide a mobile station, base station, and control station which are used together with the transmission power control apparatus in the mobile communication system.

In order to achieve the above objects, according to the basic aspect of the present invention, there is provided a transmission power control apparatus in a mobile communication system, characterized in that reception quality of a transmitted signal is compared with a control target value, and the comparison result is used for transmission power control on the remote station, and it is checked whether a frame error exists in the received signal, the control target value is increased if a frame error is detected, and the control target value is gradually decreased if no frame error is detected.

According to the present invention, there is provided a transmission power control method characterized in that reception quality of a signal transmitted from a remote station is compared with a control target value every time a slot is received, and the comparison result is used for transmission power control on the remote station, and it is checked whether a frame error exists in the received signal, every time a frame containing error detection information is received from the remote station, the control target value is increased if a frame error is detected, and the control target value is gradually decreased if no frame error is detected.

According to the present invention, there is provided a transmission control method characterized in that a channel is established between a mobile station and a base station, reception quality of a signal transmitted from the base station is compared with a control target value in the mobile station every time a slot is received, and the comparison result is used for transmission power control on the base station, and the mobile station checks whether a frame error exists in the received signal, every time a frame containing error detection information is received from the base station, increases the control target value if a frame error is detected, and gradually decreases the control target value if no frame error is detected.

According to the present invention, there is provided a transmission control method characterized in that a channel is established between a mobile station and a base station, reception quality of a signal transmitted from the mobile station is compared with a control target value in the base station every time a slot is received, and the comparison result is used for transmission power control on the mobile station, and the base station checks whether a frame error exists in the received signal, every time a frame containing error detection information is received from the mobile station, increases the control target value if a frame error is detected, and gradually decreases the control target value if no frame error is detected.

According to the present invention, there is provided a transmission power control method characterized in that diversity synthesis of signals transmitted from one or a plurality of remote stations is performed, reception quality of a synthesized signal is compared with a control target value, every time a slot is received, and the comparison result is used for transmission power control on the one or the plurality of remote stations, and it is checked whether a frame error exists in the synthesized signal, every time a frame containing error detection information is received from the plurality of remote stations, the control target value is increased if a frame error is detected, and the control target value is gradually decreased if no frame error is detected.

According to the present invention, there is provided a transmission power control method characterized in that a channel is established between a mobile station and one or a plurality of base stations, the mobile station performs diversity synthesis of signals transmitted from one or a plurality of base stations, reception quality of a synthesized signal is compared with a control target value, every time a slot is received, and the comparison result is used for transmission power control on the one or the plurality of base stations, and the mobile station checks whether a frame error exists in the received signal, every time a frame containing error detection information is received from the plurality of base stations, increases the control target value if a frame error is detected, and gradually decreases the control target value if no frame error is detected.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, each of the one or the plurality of base stations checks whether a frame error exists in the signal, every time a frame containing error detection information is received from the remote station, and notifies a control station of the check result, and the control station uses the check result to determine the presence/absence of a frame in which no error is detected, increases the control target value if the determination result indicates that there is no frame in which no error is detected, gradually decreases the control target value if the determination result indicates that there is a frame in which no error is detected, and notifies each of the one or the plurality of base stations of the control target value after updating.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, each of the one or the plurality of base stations checks whether a frame error exists in the signal, every time a frame containing error detection information is received, and notifies a control station of the check result, the control station uses the check result to determine the presence/absence of a frame in which no error is detected, and notifies each of the one and the plurality of base stations of the determination result, and each of the one or the plurality of base stations increases the control target value if the notified determination result indicates that there is no frame in which no error is detected, and gradually decreases the control target value if the determination result indicates that there is a frame in which no error is detected.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, each of the one or the plurality of base stations checks whether a frame error exists in the signal, every time a frame containing error detection information is received, and notifies a control station of the check result, the control station determines, on the basis of the check result, the presence/absence of a frame in which no error is detected, and if there is no frame in which no error is detected, notifies each of the one or the plurality of base stations of the determination result, and each of the one or the plurality of base stations increases the control target value if it is notified of the determination result, and gradually decreases the control target value if it is not notified of the determination result.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, each of the one or the plurality of base stations checks whether a frame error exists in the signal, every time a frame containing error detection information is received, and notifies a control station of the check result, the control station notifies the one or the plurality of base stations of all check results notified from the one or the plurality of base stations or all check results except for a check result from a self-station, and each of the one or the plurality of base stations determines, on the basis of the check result, the presence/absence of a frame in which no error is detected, increases the control target value if there is no frame in which no error is detected, and gradually decreases the control target value if there is a frame in which no error is detected.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, and a control station performs diversity synthesis of signals received from the one or the plurality of base stations, checks whether a frame error exists in a synthesized signal, every time a frame containing error detection information is received, increases the control target value if a frame error is detected, and gradually decreases the control target value if no frame error is detected.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, each of the one or the plurality of base stations sends a signal received from the mobile station to a control station, the control station performs diversity synthesis of reception signals sent from the respective base stations, checks whether a frame error exists in the synthesized signal, every time a frame containing error detection information is received, and notifies each of the one or the plurality of base stations of the check result, and each of the one or the plurality of base stations increases the control target value if the check result indicates that a frame error is detected, and gradually decreases the control target value if no frame error is detected.

According to the present invention, there is provided a transmission power control method characterized in that a channel is established between a mobile station and one or a plurality of base stations, reception quality of a signal transmitted from the mobile station is compared with a control target value in the one or the plurality of base stations, every time a slot is received, and the comparison result is used for transmission power control on the mobile station, each of the one or the plurality of base stations sends a signal received from the mobile station to a control station, the control station performs diversity synthesis of reception signals sent from each of the one or the plurality of base stations, checks whether a frame error exists in the synthesized signal, every time a frame containing error detection information is received, and if a frame error is detected, notifies each of the one or the plurality of base stations of the result, and each of the one or the plurality of base stations increases the control target value if the notification is received, and gradually decreases the control target value if the notification is not received.

According to the present invention, there is provided a transmission power control method characterized in that reception quality of a signal transmitted from a remote station, mobile station, or base station is compared with a control target value, the comparison result is used for transmission power control on the remote station, base station, or mobile station, the number of bits in error is checked, and the control target value is increased in accordance with the number of bits in error and decreased in accordance with the number of bits not in error.

If a frame error is detected, the control target value is increased, and if no frame error is detected, the control target value is gradually decreased to match channel quality to a channel quality target value.

If a frame error is detected, the control target value may be increased, and if no frame error is detected, the control target value may be gradually decreased to match a frame error rate to a channel quality target value.

If a frame error is detected, the control target value may be increased by a first predetermined value, and if no frame error is detected, the control target value is gradually decreased such that the control target value may be decreased by the first predetermined value in an average time during which a frame error is detected when a frame error rate is set to a desired value.

If a frame error is detected, the control target value may be increased by a first predetermined value, and if no frame error is detected, the control target value may be gradually decreased such that the control target value is decreased by the first predetermined value while frames fewer than a reciprocal of a channel quality target value based on a frame error rate by one are received.

If a frame error is detected, the control target value may be increased by a first predetermined value, and if no frame error is detected, the control target value may be decreased by a second predetermined value, and a ratio of the first predetermined value to the second predetermined value may be determined in accordance with a channel quality target value.

If a frame error is detected, the control target value may be increased by a first predetermined value, and if no frame error is detected, the control target value may be decreased by a second predetermined value, and a ratio of the first predetermined value to the second predetermined value may be determined in accordance with a channel quality target value based on a frame error rate.

If a frame error is detected, the control target value may be increased by a first predetermined value, and if no frame error is detected, the control target value may be decreased by a second predetermined value, and a ratio of the first predetermined value to the second predetermined value may be set to a reciprocal of a channel quality target value based on a frame error rate.

If a frame error is detected, the control target value may be increased by a first predetermined value, and if no frame error is detected, the control target value may be decreased by a second predetermined value, and a ratio of the first predetermined value to the second predetermined value may be set to a value smaller than a reciprocal of a channel quality target value based on a frame error rate by one.

If a frame error is detected, the control target value may be increased by a first predetermined value, and if no frame error is detected, the control target value may be decreased by a second predetermined value, and a product of a channel quality target value based on a frame error rate and the first predetermined value may be set as the second predetermined value.

If a frame error is detected, the control target value may be increased by a first predetermined value, and if no frame error is detected, the control target value may be decreased by a second predetermined value, and a product of a channel quality target value based on a frame error rate and the first predetermined value may be equal to a product of a value smaller than one by a channel quality target value based on a frame error rate and the second predetermined value.

As obvious from the above aspects, according to the present invention, when a propagation environment based on multipath transmission and the like or moving speed changes, channel quality can be kept constant by quickly changing a control target value. In addition, even if a propagation environment based on multipath transmission and the like or moving speed changes, desired channel quality based on a frame error rate or the like can be guaranteed. As compared with a case where frame errors randomly occur, in particular, the present invention has an outstanding effect of guaranteeing channel quality by making the occurrence of frame errors periodic and nearly matching the frame error rate to a channel quality target value even in each shot time unit. Furthermore, since variations in frame error rate in each shot time unit can be suppressed, when a strict requirement is imposed on the frame error rate in each short time unit, there is no need to set a high transmission power with a margin in consideration of the variations. This makes it possible to reduce interference wave power and increase channel capacity.

The above and many other objects, features and advantages of the present invention will become manifest to those skilled in the art upon making reference to the following detailed description and accompanying drawings in which preferred embodiments incorporating the principle of the invention are shown by way of illustrative examples.

BEST MODE OF CARRYING OUT THE INVENTION

Several preferred embodiments of the present invention will be described below with reference to the accompanying drawings.

Figure 1:
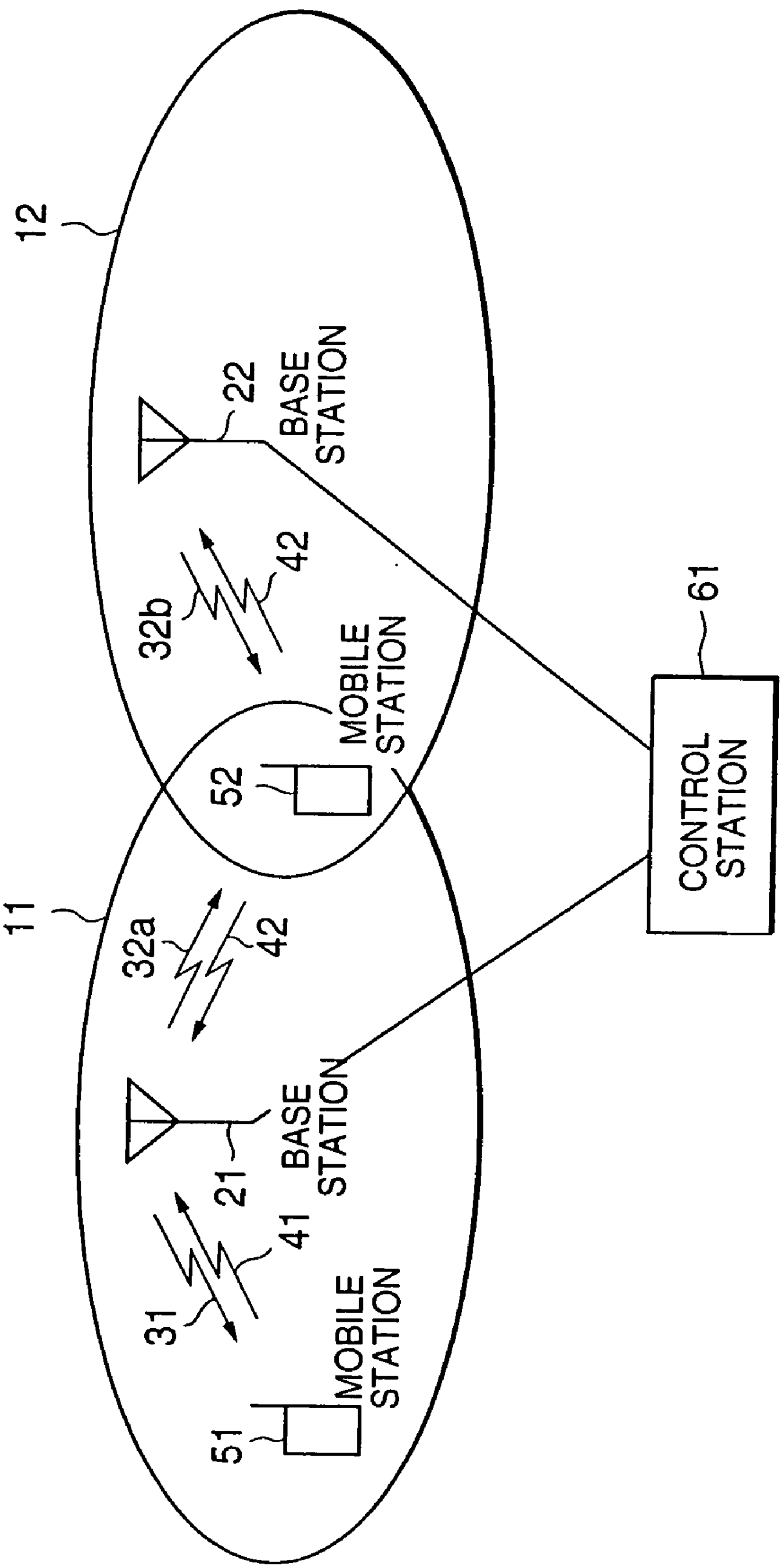
FIG. 1 is a view showing the arrangement of a mobile communication system in which the present invention is practiced.

A transmission power control method and transmission power control apparatus according to the first embodiment are implemented in a mobile communication system having the arrangement shown in FIG. 1. In the mobile communication system shown in FIG. 1, the service area is divided into a plurality of cells 11 and 12. In the cells 11 and 12, base stations 21 and 22 are respectively installed and mobile stations 51 and 52 exist. The base stations 21 and 22 are connected to a control station 61. The control station is further connected to a network (not shown) formed by another control station. Although not shown, this mobile communication system includes many other base stations, and many mobile stations exist in each cell. At the time of communication, mobile stations or a base station and mobile station serve as transmission destinations.

Each of the base stations 21 and 22 transmits pilot signals (not shown) at a predetermined transmission power. Each of mobile stations 51 and 52 has a measurement device (not shown) for measuring the power of a pilot signal, and measures the reception power of a pilot signal.

In performing communication, a channel is established between a mobile station and a base station from which a pilot signal having a maximum reception power is received, thereby starting communication. If the difference in reception power between a pilot signal having a highest reception power and a pilot signal having a second highest reception power falls within a predetermined value, channels are established between the mobile station and the two corresponding base stations.

In the mobile station 51, the pilot signal from the base station 21 exhibits the maximum reception power. The mobile station 51 therefore establishes a channel to the base station 21. A downstream channel signal 31 is a signal that is transmitted from the base station 21 to the mobile station 51. An upstream channel signal 41 is a signal that is transmitted from the mobile station 51 to the base station 21. In the mobile station 52, the difference between the reception power of a pilot signal from the base station 21 and that of a pilot signal from the base station 22 is small. For this reason, the mobile station 52 establishes channels to both the base stations 21 and 22. In this case, the mobile station 52 communicates with the base stations 21 and 22 by using downstream channel signals 32*a* and 32*b* and upstream channel signal 42.

Figure 6:
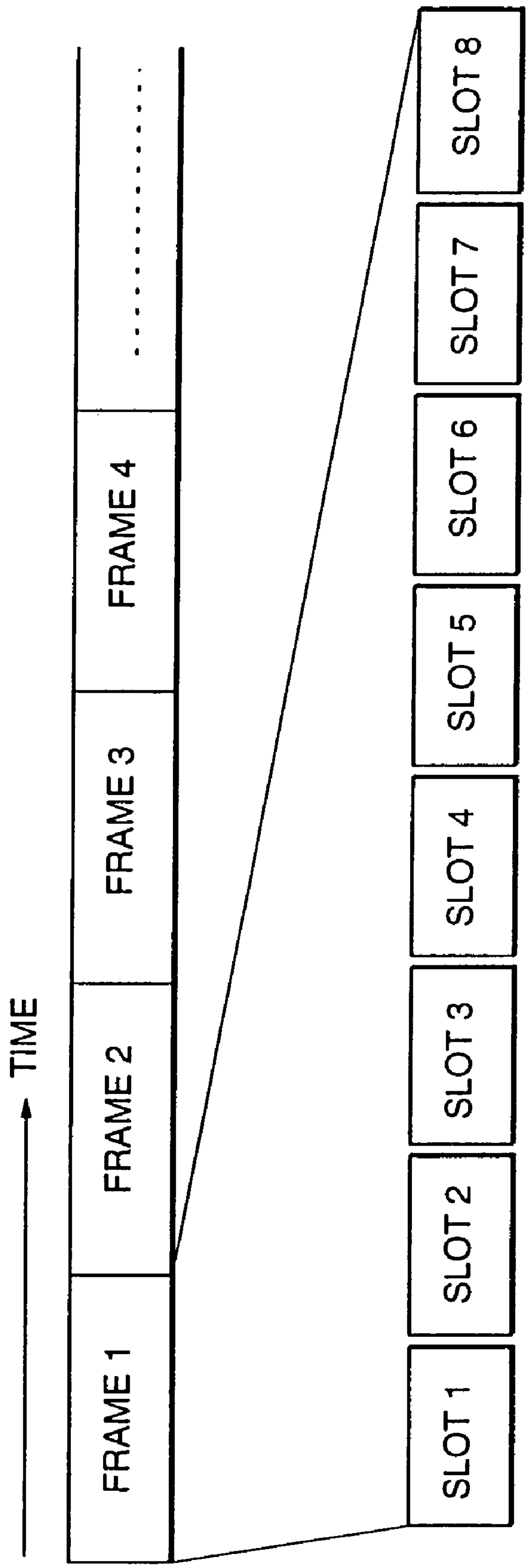
FIG. 6 is a view showing the frame format of a signal used in the present invention.

As shown in FIG. 6, each of the downstream channel signals 31, 32*a*, 32*b* and downstream channel signals 41 and 42 is constituted by repetitive frames each having a predetermined time length. Each frame consists of a plurality of slots each having a shorter duration. In the example shown in FIG. 6, one frame consists of eight slots. Each slot of a downstream channel signal includes an instruction to control the transmission power of an upstream channel signal. Each slot of an upstream channel signal includes an instruction to control the transmission power of a downstream channel signal.

In both an upstream channel and a downstream channel, on the transmitting side, a CRC (Cyclic Redundancy Check) code serving as an error detection code is added to user information to be transmitted for each bit sequence having a predetermined length and transmitted in one frame, and the resultant information is subjected to error correction encoding such as convolution encoding. The resultant data is segmented into eight equal portions. Each segment is then inserted into a slot to be transmitted together with a transmission power control instruction.

On the receiving side, every time the eight slots of each frame are received, the transmission power control instructions are removed, and the segmented data are extracted and merged. The merged data is then subjected to error correction decoding, and error detection is performed by using the CRC codes contained in the decoded data.

Figure 2:
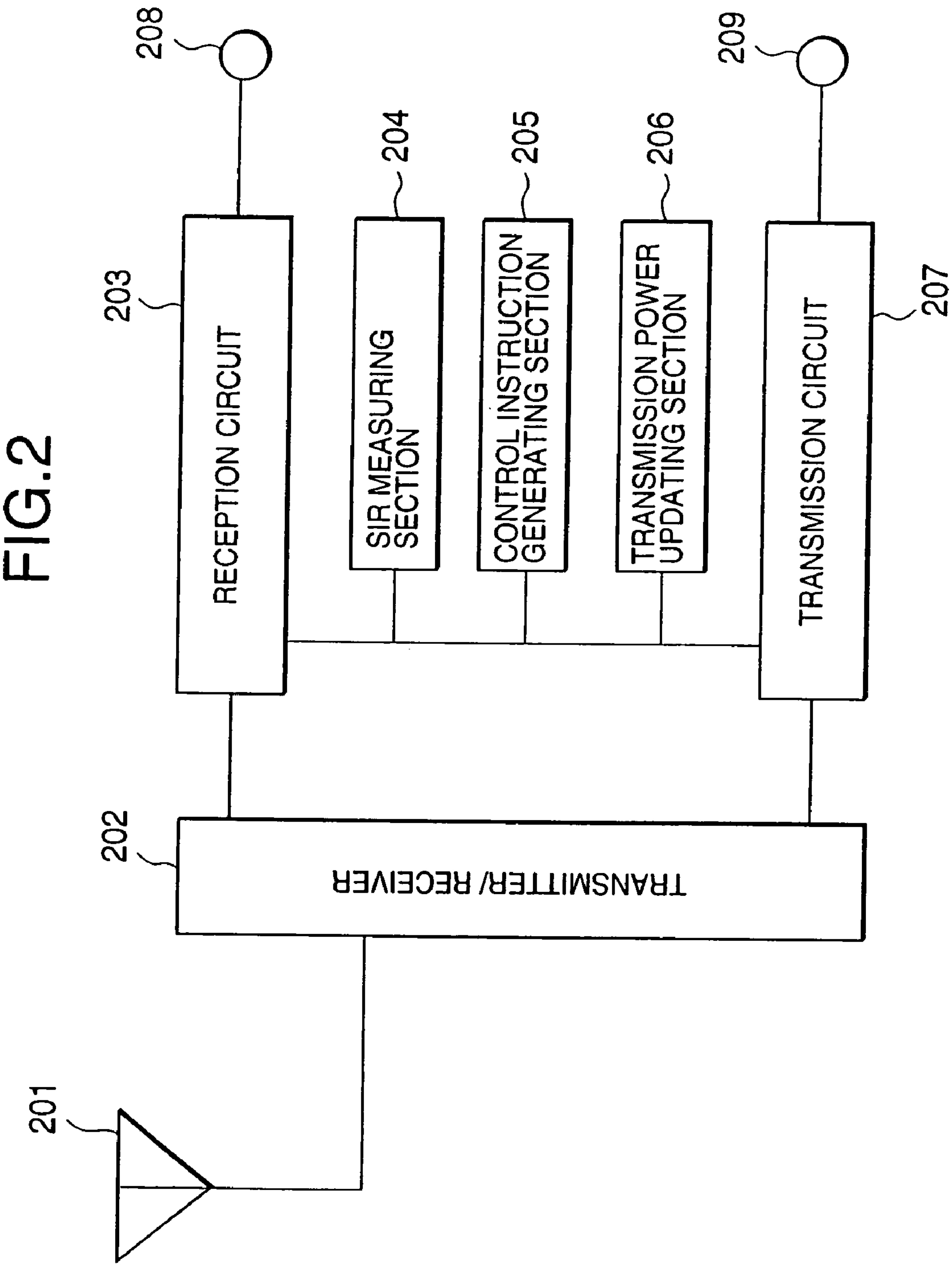
FIG. 2 is a view showing an example of the arrangement of a base station or mobile station.

FIG. 2 shows an example of the arrangement of a base station apparatus in each of the base stations 21 and 22. The base station apparatus is comprised of an antenna 201, transmitter/receiver 202, reception circuit 203, SIR measuring section 204, control instruction generating section 205, transmission power updating section 206, transmission circuit 207, reception circuit output terminal 208, and transmission circuit output terminal 209.

In the base station, the reception circuit 203 receives an upstream channel signal transmitted from a mobile station through the antenna 201 and transmitter/receiver 202. Every time a slot of an upstream channel signal is received, the reception circuit 203 sends the control instruction contained in the slot to the transmission power updating section 206. The transmission power updating section 206 updates the transmission power of a downstream channel signal in accordance with the control instruction sent from the reception circuit 203 and notifies the transmission circuit 207 of the corresponding value. The transmission circuit 207 sets the transmission power of a downstream channel signal to the value notified from the transmission power updating section 206. A method of updating the transmission power of a downstream channel in the transmission power updating section 206 will be described with reference to the flow chart of FIG. 4. In this flow chart and a description thereof, power will be treated as a decibel value.

Figure 4:
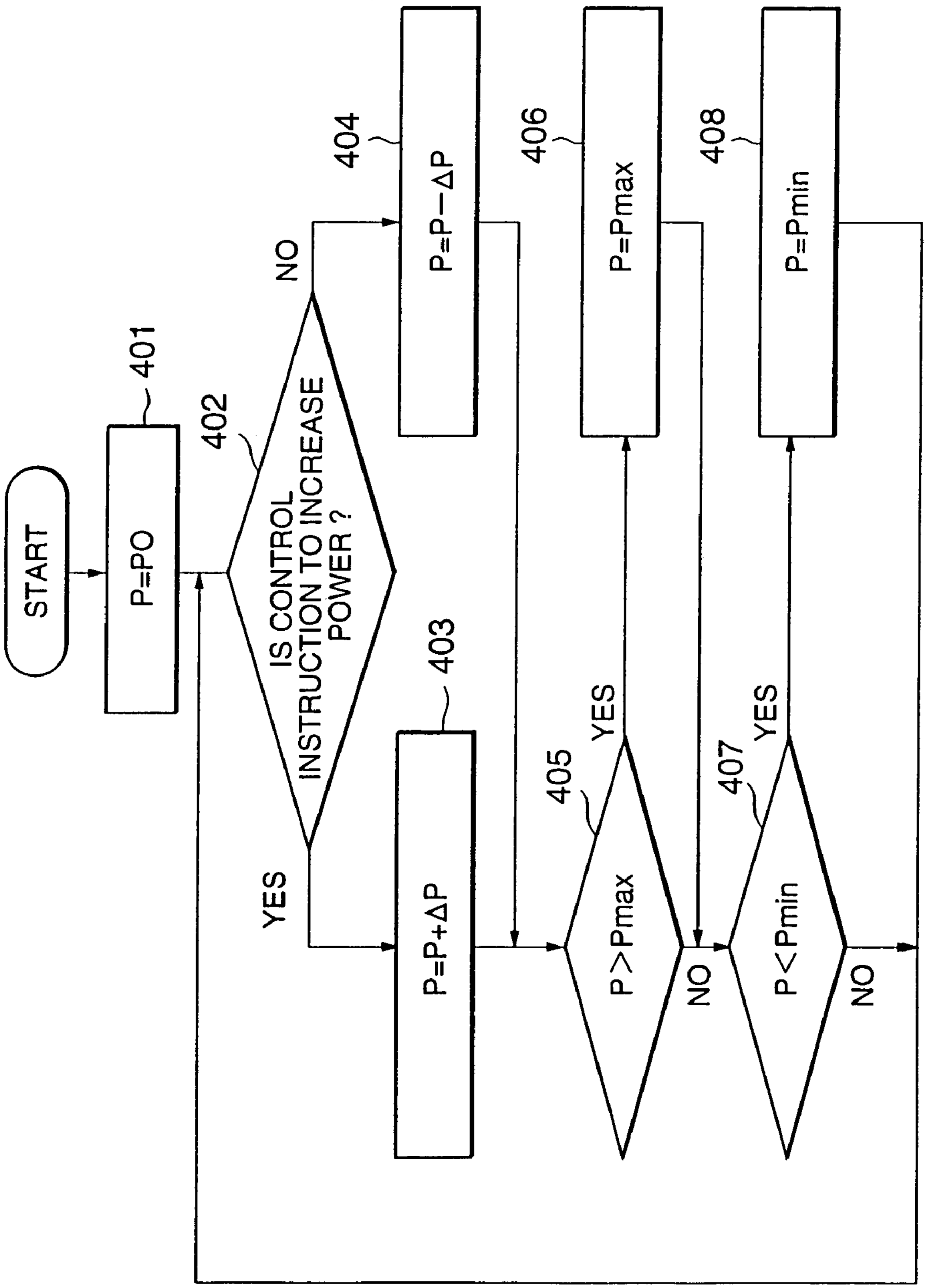
FIG. 4 is a flow chart showing a procedure for transmission power control in a base station.

FIG. 4 is a flow chart showing a procedure for controlling the transmission power of a downstream channel signal in the transmission power updating section 206. Upon starting communication, the base station sets a transmission power P of a downstream channel signal to an initial value PO (step 401). Assume that PO is an arbitrary value in a transmission power control range. Upon receiving a slot of an upstream channel signal transmitted from a mobile station, if it is determined in step 402 that the control instruction in the slot is a power increase instruction, the base station increases the transmission power of the downstream channel by a predetermined value (step 403). If it is determined that the instruction is a power decrease instruction, the base station decreases the transmission power of the downstream channel by a predetermined value (step 404). If the transmission power P is higher than maximum value Pmax, P is set to Pmax (steps 405 and 406). If the transmission power P is lower than a minimum value Pmin, P is set to Pmin (steps 407 and 408). The processing is then repeated again from step 402.

The SIR measuring section 204 is connected to the reception circuit 203. Every time the reception circuit 203 receives a slot of an upstream channel signal, the SIR measuring section 204 measures the signal-to-interference ratio (SIR) of the slot, and sends the measurement value to the control instruction generating section 205. The control instruction generating section 205 compares the measured SIR with a control target value. If the SIR is lower than the control target value, the control instruction generating section 205 generates a control instruction to increase power. If the SIR is larger than the control target value, the control instruction generating section 205 generates a control instruction to decrease power. The generated control instruction is sent to the transmission circuit 207. The transmission circuit 207 then generates a downstream channel signal containing the control instructions and transmits it to the mobile station through the transmitter/receiver 202 and antenna 201.

Figure 3:
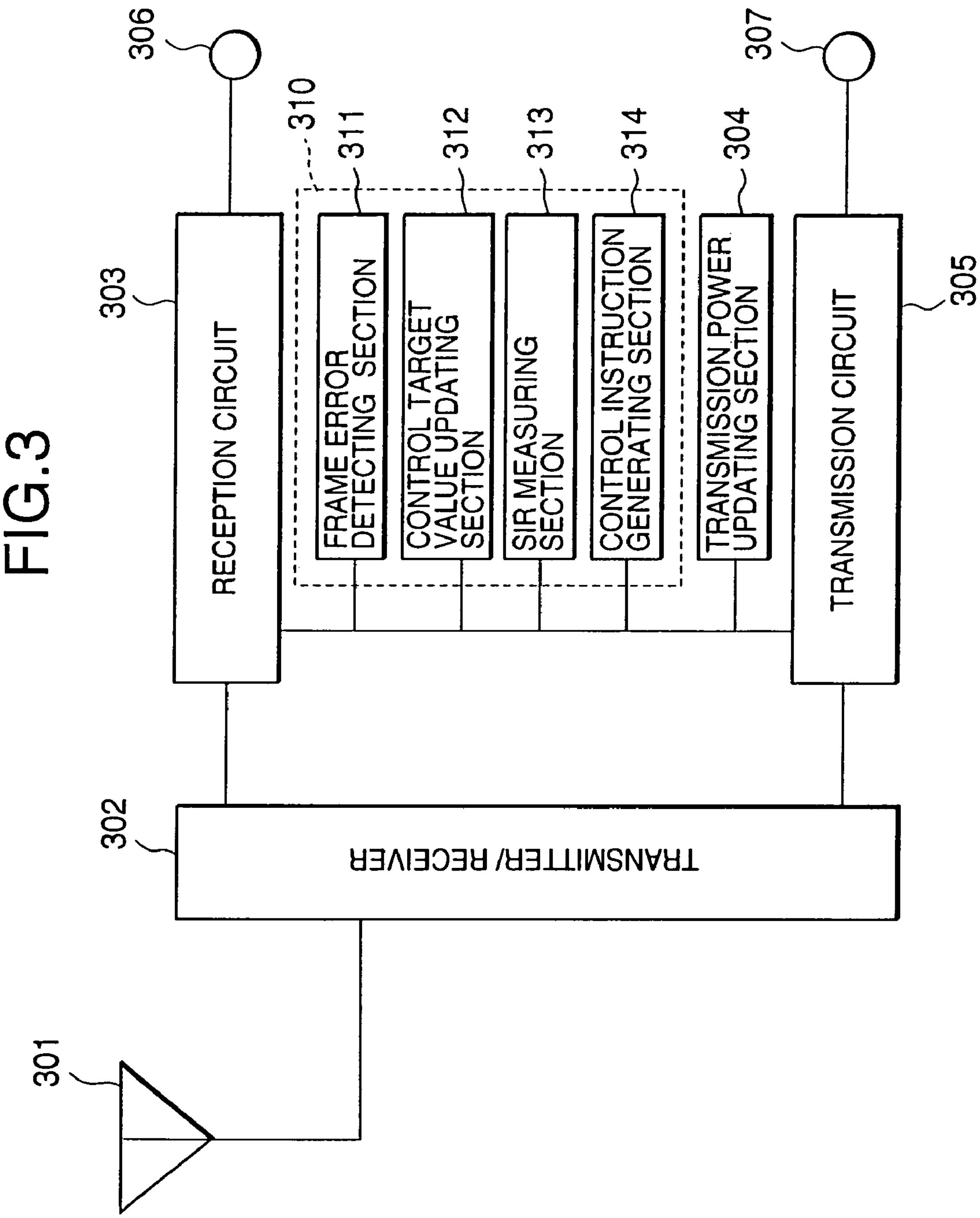
FIG. 3 is a view showing an example of the arrangement of a mobile station or base station.

FIG. 3 shows an example of the arrangement of a mobile station apparatus in each of the mobile stations 51 and 52. The mobile station apparatus is comprised of an antenna 301, transmitter/receiver 302, reception circuit 303, transmission power updating section 304, transmission circuit 305, reception circuit output terminal 306, transmission circuit output terminal 307, and transmission power control apparatus 310. The transmission power control apparatus 310 is comprised of a frame error detecting section 311, control target value updating section 312, SIR measuring section 313, and control instruction generating section 314 and connected to the reception circuit 303, transmission power updating section 304, and transmission circuit 305.

In the mobile station, the reception circuit 303 receives a downstream channel signal transmitted from a base station through the antenna 301 and transmitter/receiver 302. Every time a slot of a downstream channel signal is received, the reception circuit 303 sends the control instruction contained in the slot to the transmission power updating section 304. The transmission power updating section 304 updates the transmission power of an upstream channel signal in accordance with the control instruction sent from the reception circuit 303 and notifies the transmission circuit 305 of the corresponding value. The transmission circuit 305 sets the transmission power of an upstream channel signal to the value notified from the transmission power updating section 304.

The transmission power updating section 304 updates transmission power in the same manner as the transmission power updating section 206 of the base station, but differs in operation depending on the state of the mobile station. Since the mobile station 51 has established a channel to the base station 21, the transmission power updating section 304 of the mobile station 51 operates in accordance with a control instruction from the base station 21. If the control instruction is a power increase instruction, the transmission power updating section 304 increases the transmission power by a predetermined value. If the control instruction is a power decrease instruction, the transmission power updating section 304 decreases the transmission power by a predetermined value. Since the mobile station 52 has established channels to both the base stations 21 and 22, the transmission power updating section 304 of the mobile station 52 receives control instructions from the two base stations. If the two control instructions are power increase instructions, the transmission power updating section 304 increases the transmission power by a predetermined value. If at least one control instruction is a power decrease instruction, the transmission power updating section 304 decreases the transmission power by a predetermined value. Such operation is performed to maintain channel quality in at least one base station by setting at least one reception quality as a control target value and to prevent the reception quality from exceeding the required reception quality so as to suppress interference wave power.

The SIR measuring section 313 is connected to the reception circuit 303. Every time the reception circuit 303 receives a slot of a downstream channel signal, the SIR measuring section 313 measures the signal-to-interference ratio (SIR) of the slot, and sends the measurement value to the control instruction generating section 314. In this case, the reception circuit 303 of the mobile station 51 receives a signal from the base station 21, and the SIR measuring section measures the SIR of the signal. The reception circuit 303 of the mobile station 52 receives signals from the two base stations 21 and 22 and performs diversity synthesis. The SIR measuring section measures the SIR of the synthesized signal.

The control instruction generating section 314 compares the measured SIR with a control target value. If the SIR is smaller than the control target value, the control instruction generating section 314 generates a control instruction to increase power. If the SIR is larger than the control target value, the control instruction generating section 314 generates a control instruction to decrease power. The generated control instruction is sent to the transmission circuit 305. The transmission circuit 305 generates an upstream channel signal containing the control instructions and transmits it to the base station through the transmitter/receiver 302 and antenna 301.

In addition, every time the reception circuit 303 receives a frame, the frame error detecting section 311 checks the presence/absence of an error by using the CRC code. In this case, the frame error detecting section 311 of the mobile station 51 detects a frame error in the signal received from the base station 21. In contrast to this, the frame error detecting section 311 of the mobile station 52 detects a frame error in the signal obtained by the reception circuit 303 by diversity synthesis of the signals from the base stations 21 and 22.

The frame error detecting section 311 then notifies the control target value updating section 312 of the result obtained by checking the presence/absence of an error. If it is determined on the basis of the notified result that a frame error is detected, the control target value updating section 312 increases the control target value. Otherwise, the control target value updating section 312 gradually decreases the control target value. If the control target value is to be gradually decreased, channel quality based on a frame error rate or the like is made equal to a channel quality target value.

For this purpose, if a frame error is detected, the control target value is increased by a predetermined SIRinc, where if no frame error is detected, the control target value is gradually decreased such that the control target value is decreased by the predetermined value SIRinc in an average time during which a frame error is detected under desired channel quality.

If the desired channel quality is a desired frame error rate, the control target value is gradually decreased such that the control target value is decreased by the predetermined value SIRinc in a time during which frames equal in number to the reciprocal of the desired frame error rate are received.

If, therefore, a frame error is detected, the control target value is increased by the predetermined value SIRinc. If no frame error is detected, the control target value is decreased by another predetermined value SIRdec. The ratio of SIRinc to SIRdec is determined in accordance with a channel quality target value based on a desired frame error rate or the like.

More specifically, the ratio of SIRinc to SIRdec is set to the reciprocal (1/Rtarget) of a desired frame error rate Rtarget. Therefore, SIRdec is the product (Rtarget×SIRinc) of the desired frame error rate and SIRinc. If the desired frame error rate is smaller than 0.1, the reciprocal is larger than 10, which is sufficiently larger than 1. Even if, therefore, the ratio of SIRinc to SIRdec is set to a value (1/Rtarget−1) smaller than the reciprocal of the desired frame rate error by one, SIRinc and SIRdec can be set in almost the same manner. This amounts to making the product (Rtarget×SIRinc) of the desired frame error rate and SIRinc equal to the product ((1−Rtarget)×SIRdec) of a value smaller than one by the desired frame error rate and SIRdec. In this case, SIRdec is equal to the product ({Rtarget/(1−Rtarget)}×SIRinc) of the ratio of the desired frame error rate to the value smaller than the desired frame error rate by one and SIRinc. Upper and lower limits are set for the control target value.

Figure 5:
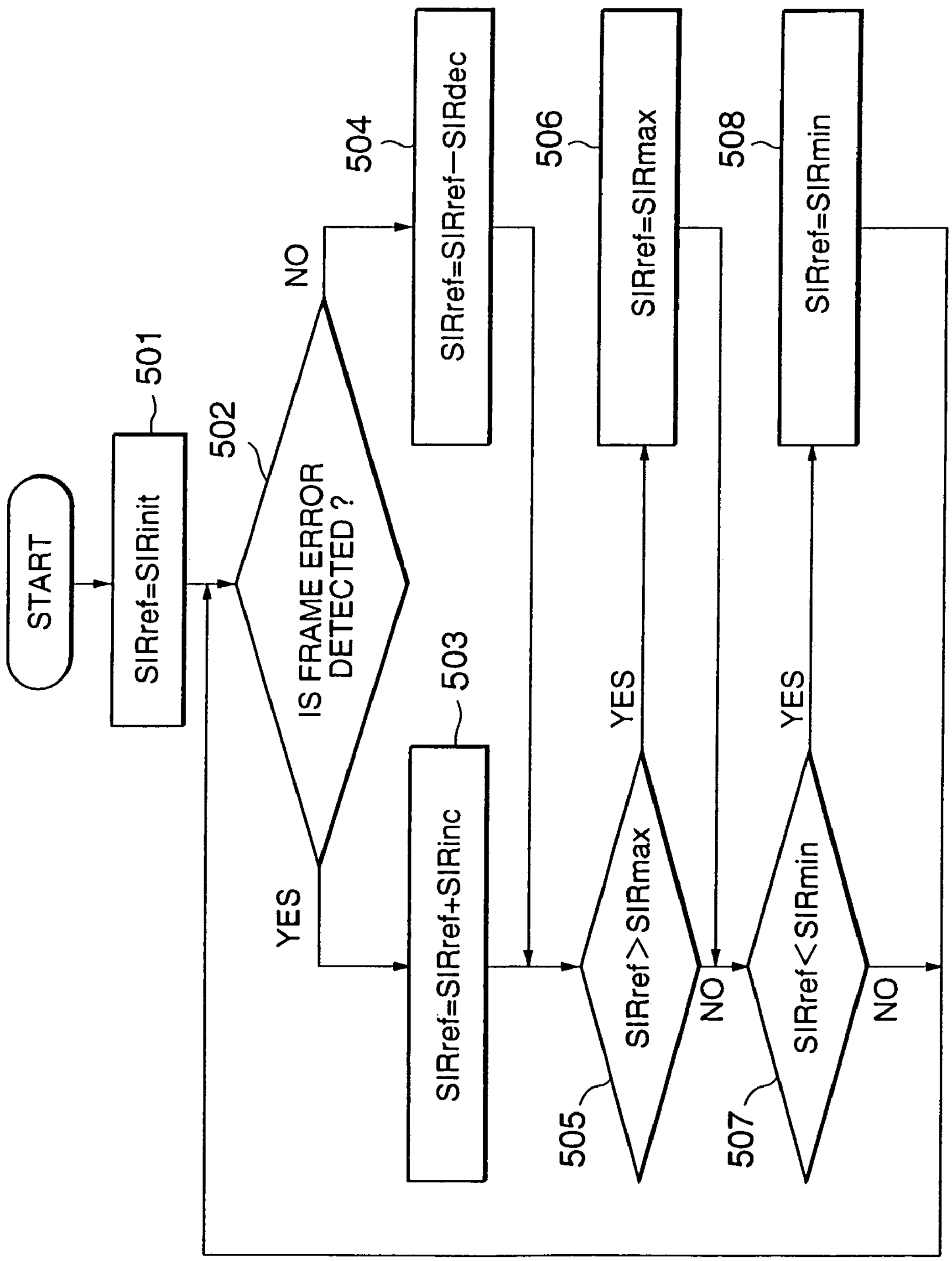
FIG. 5 is a flow chart showing a procedure for updating a control target value in a mobile station or base station.

The operation of the control target value updating section 312 of the mobile station will be further described with reference to the flow chart of FIG. 5. FIG. 5 is a flow chart showing a procedure for updating c control target value in the control target value updating section 312. When communication is started, the mobile station sets a control target value SIRref to an initial value SIRinit (step 501). As SIRref, a control target value is set, which makes channel quality equal to a channel quality target value in an average propagation environment. Every time a frame of a downstream channel signal transmitted from a base station is received, the mobile station receives the result notified from the frame error detecting section 311. If a frame error is detected, the mobile station increases the control target value SIRref by the predetermined value SIRinc (step 503). If no frame error is detected, the mobile station decreases the control target value SIRref by the different predetermined value SIRdec (step 504). If the control target value SIRref is larger than a maximum value SIRmax, the control target value SIRref is set to SIRmax (steps 505 and 506). If the control target value SIRref is smaller than a minimum value SIRmin, the control target value SIRref is set to SIRmin (steps 507 and 508). Step 502 is then repeated.

According to this method, when a frame error is detected, the control target value increases. If no frame error is detected in subsequent frames, since the control target value gradually decreases, the control target value remains relatively large. While the control target value is set to be large, the base station performs transmission with a high transmission power accordingly, and reception quality based on a signal-to-interference ratio or the like is good. Therefore, the probability of occurrence of frame errors is low, and frames in which no frame error is detected continue. The control target value gradually decreases, and the base station performs transmission with a low transmission power accordingly. Since the reception quality based on a signal-to-interference ratio or the like deteriorates, the probability of occurrence of frame errors increases, and a frame error occurs. As a consequence, the control target value increases again, and the probability of occurrence of frame errors decreases.

As described above, when a frame error is detected, the probability of occurrence of frame errors decreases. After a lapse of a certain period of time, however, the probability of occurrence of frame errors increases, and a frame error occurs. That is, frame errors do not occur randomly but occur periodically. Therefore, the frame error rate becomes an almost constant value, and predetermined channel quality can be obtained.

When the propagation environment abruptly changes due to a change in the moving speed of the mobile station, and the control target value as a predetermined frame error rate increases, the time that elapses before a next frame error occurs is shortened. Subsequently, frame errors occur almost periodically, and hence a deterioration in channel quality does not continue, and the channel quality is kept constant. In contrast to this, when the control target value as the predetermined frame error rate decreases due to a change in propagation environment, the time that elapses before a next frame error occurs is prolonged. Subsequently, however, frame errors occur almost periodically, and hence the channel quality does not increase excessively but remains constant. As described above, according to this method, even if the propagation environment abruptly changes, the frame error rate can be kept almost constant.

In the first embodiment, letting SIRinc be an increase in control target value when a frame error is detected, SIRdec be a decrease in control target value when no frame error is detected, and Rtarget be a channel quality target value as a desired frame error rate, an increase and decrease in control target value are determined so $$SIRdec = Rtarget \times SIRinc \quad (1)$$

or $$SIRdec = \{Rtarget/(1-Rtarget)\} \times SIRinc \quad (2)$$

If the number of frame errors in a number Nall of frames is represented by Nerror, the number of frames in which no error is detected is given by Nall−Nerror. Letting SIRtarget (i) be the control target value at the first frame, and SIRtarget (i+Nall) be the control target value immediately after the last frame, $$SIRtarget(i+Nall) = SIRtarget(i) + Nerror \times SIRinc \; (Nall-Nerror) \times SIRdec \quad (3)$$

Since a frame error rate FER during this period is given by Nerror/Nall, from equation (3), we have $$FER = Nerror/Nall = \{SIRdec + (SIRtarget(i+Nall) - SIRtarget(i)/Nall\}/(SIRinc+SIRdec) \quad (4)$$

When the propagation environment during this period is constant, since the control target value increases/decreases within an almost constant range, the difference between SIRtarget(i+Nall) and SIRtarget(i) becomes a small value within a control target value variation range at most.

Assume that the propagation environment changes and the control target value variation range changes. Even in this case, if Nall is a relatively large value, since (SIRtarget (i+Nall)SIRtarget(i))/Nall becomes sufficiently smaller than SIRdec, equation (4) can be approximated by $$FER = SIRdec/(SIRinc+SIRdec) \quad (5)$$

If SIRinc and SIRdec are set to satisfy equation (1), according to equations (5) and (1), FER is given by $$FER = Rtarget/(1+Rtarget) \quad (6)$$

In general, since Rtarget is set to 0.01 or less, which is a value sufficiently smaller than 1, FER becomes slightly smaller than Rtarget. With the method of this embodiment, therefore, even if the propagation environment changes during communication, the frame error rate during communication can be nearly matched to a channel quality target value as a frame error rate.

In addition, if SIRinc and SIRdec are set to satisfy equation (2), according to equations (5) and (2), FER is given by $$FER = Rtarget \quad (7)$$

In this case as well, even if the propagation environment changes during communication, the frame error rate during communication can be nearly matched to a channel quality target value as a frame error rate.

Even if the frame error rate is fixed to an ideal control target value as a channel quality target value in a constant propagation environment, the frame error rate in a short time unit during which a frame error occurs about ten times varies depending on the number of frame errors that occur randomly within this time. In contrast to this, according to the method of the first embodiment, even if the frame error rate in a short time unit during which a frame error occurs about 10 times is calculated, the first control target value in each time unit and the last control target value are almost equal to each other, thus satisfying equations (6) and (7). Even in a short time unit, the frame error rate can be nearly matched to a channel quality target value, thus reducing variations in frame error rate. In other words, as compared with the case where frame errors occur randomly when a control target value is fixed, in the method of the first embodiment, frame errors occur periodically, and hence the frame error rate in each short time unit approaches a channel quality target value.

Another embodiment of the present invention will be described next.

A transmission power control method and transmission power control apparatus according to the second embodiment are implemented by the mobile communication system shown in FIG. 1 as in the first embodiment. The same method as described above is used to establish channels between base stations and mobile stations. A mobile station 51 establishes a channel to a base station 21, whereas a mobile station 52 simultaneously establishes channels to the base station 21 and a base station 22. In addition, the slot and frame formats, error detection code adding method, and error correction encoding method are the same as those described above.

In the first embodiment, a mobile station changes a control target value to be referred to when a control instruction for transmission power control is to be generated. In the second embodiment, a base station and control station change a control target value to be referred to when a control instruction for transmission power control is to be generated. A base station in the second embodiment has the same arrangement as that of a mobile station in the first embodiment. A mobile station in the second embodiment has the same arrangement as that of a base station in the first embodiment. In the following description, the drawings that are used to explain an example of the arrangement of each base station in the first embodiment are used to explain an example of the arrangement of each mobile station in the second embodiment, and the drawings that are used to explain an example of the arrangement of each mobile station in the first embodiment are used to explain an example of the arrangement of each base station in the second embodiment.

As described above, the mobile stations 51 and 52 have the same arrangement as that of each base station in the first embodiment, which is shown in FIG. 2.

Referring to FIG. 2, each of the mobile stations 51 and 52 is comprised of an antenna 201, transmitter/receiver 202, reception circuit 203, SIR measuring section 204, control instruction generating section 205, transmission power updating section 206, transmission circuit 207, reception circuit output terminal 208, and transmission circuit output terminal 209.

In the mobile station, the reception circuit 203 receives a downstream channel signal transmitted from a base station through the antenna 201 and transmitter/receiver 202. Every time a slot of a downstream channel signal is received, the reception circuit 203 sends the control instruction contained in the slot to the transmission power updating section 206. The transmission power updating section 206 updates the transmission power of an upstream channel signal in accordance with the control instruction sent from the reception circuit 203, and notifies the transmission circuit 207 of the corresponding value. The transmission circuit 207 sets the transmission power of an upstream channel signal to the value notified from the transmission power updating section 206.

The transmission power updating sections 206 of the mobile stations 51 and 52 differ in their operations depending on the states of the mobile stations. Since the mobile station 51 has established a channel to the base station 21, the transmission power updating section 206 of the mobile station 51 operates in accordance with a control instruction from the base station 21. If the control instruction is a power increase instruction, the transmission power updating section 206 increases the transmission power by a predetermined value. If the control instruction is a power decrease instruction, the transmission power updating section 206 decreases the transmission power by a predetermined value. Since the mobile station 52 has established channels to both the base stations 21 and 22, the transmission power updating section 206 of the mobile station 52 receives control instructions from the two base stations. If the two control instructions are power increase instructions, the transmission power updating section 206 increases the transmission power by a predetermined value. If at least one control instruction is a power decrease instruction, the transmission power updating section 206 decreases the transmission power by a predetermined value. Such operation is performed to maintain channel quality in at least one base station by setting at least one reception quality as a control target value and to prevent the reception quality from exceeding the required reception quality so as to suppress interference wave power.

The SIR measuring section 204 is connected to the reception circuit 203. Every time the reception circuit 203 receives a slot of a downstream channel signal, the SIR measuring section 204 measures the signal-to-interference ratio (SIR) of the slot, and sends the measurement value to the control instruction generating section 205. The control instruction generating section 205 compares the measured SIR with a control target value. If the SIR is smaller than the control target value, the control instruction generating section 205 generates a control instruction to increase power. If the SIR is larger than the control target value, the control instruction generating section 205 generates a control instruction to decrease power. The generated control instruction is sent to the transmission circuit 207. The transmission circuit 207 generates an upstream channel signal containing the control instructions and transmits it to the base station through the transmitter/receiver 202 and antenna 201. As described above, the arrangement of each of the base stations 21 and 22 is the same as that of each mobile station in the first embodiment and shown in FIG. 3.

The base station apparatus is comprised of an antenna 301, transmitter/receiver 302, reception circuit 303, transmission power updating section 304, transmission circuit 305, reception circuit output terminal 306, transmission circuit output terminal 307, and transmission power control apparatus 310. The transmission power control apparatus 310 is comprised of a frame error detecting section 311, control target value updating section 312, SIR measuring section 313, and control instruction generating section 314 and connected to the reception circuit 303, transmission power updating section 304, and transmission circuit 305.

In the base station, the reception circuit 303 receives an upstream channel signal transmitted from a mobile station through the antenna 301 and transmitter/receiver 302. Every time a slot of an upstream channel signal is received, the reception circuit 303 sends the control instruction contained in the slot to the transmission power updating section 304. The transmission power updating section 304 updates the transmission power of a downstream channel signal in accordance with the control instruction sent from the reception circuit 303 and notifies the transmission circuit 305 of the corresponding value. The transmission circuit 305 sets the transmission power of a downstream channel signal to the value notified from the transmission power updating section 304. The method of updating the transmission power of a downstream channel in the transmission power updating section 304 is the same as the method of updating the transmission power of a downstream channel in the transmission power updating section in the first embodiment.

The SIR measuring section 313 is connected to the reception circuit 303. Every time the reception circuit 303 receives a slot of an upstream channel signal, the SIR measuring section 313 measures the signal-to-interference ratio (SIR) of the slot, and sends the measurement value to the control instruction generating section 314.

The control instruction generating section 314 compares the measured SIR with a control target value. If the SIR is smaller than the control target value, the control instruction generating section 314 generates a control instruction to increase power. If the SIR is larger than the control target value, the control instruction generating section 314 generates a control instruction to decrease power. The generated control instruction is sent to the transmission circuit 305. The transmission circuit 305 generates a downstream channel signal containing the control instructions and transmits it to the base station through the transmitter/receiver 302 and antenna 301.

The frame error detecting sections 311 and control target value updating sections 312 of the base stations 21 and 22 differ in their operations depending on whether a mobile station has established a channel to one base station or channels to a plurality of base stations. Updating of the control target value for a mobile station that has established a channel to one base station is performed by the base station. Updating of the control target value for a mobile station that has established channels to a plurality of base stations is performed by a control station to which these base stations are connected, and the respective base stations are notified of the resultant data. Each base station sets and uses the notified control target value. This operation is performed for the following reason. When a mobile station has established channels to a plurality of base stations, the channel quality of an upstream channel obtained by the control station by diversity synthesis of signals received by the base stations becomes actual channel quality between the mobile station and a remote station. Therefore, the channel quality improved by the diversity synthesis effect must be kept constant.

As for the mobile station 51, since the mobile station 51 has established a channel to only the base station 21, the control target value is updated by the mobile station 51. In the mobile station 51, every time the reception circuit 303 receives a frame, the frame error detecting section 311 checks the presence/absence of an error by using a CRC code.

The frame error detecting section 311 then notifies the control target value updating section 312 of the result obtained by checking the presence/absence of an error. If it is determined on the basis of the notified result that a frame error is detected, the control target value updating section 312 increases the control target value. Otherwise, the control target value updating section 312 gradually decreases the control target value. If the control target value is to be gradually decreased, channel quality based on a frame error rate or the like is made equal to a channel quality target value.

The manner of determining an increase and decrease in changing the control target value is the same as the manner of changing the control target value in each mobile station in the first embodiment. The operation of the control target value updating section 312 of the mobile station 51 can be explained with reference to the flow chart of FIG. 5.

When communication is started, the mobile station 51 sets a control target value SIRref to an initial value SIRinit (step 501). As SIRref, a control target value is set, which makes channel quality equal to a channel quality target value in an average propagation environment. Every time a frame of an upstream channel signal transmitted from a mobile station is received, the base station receives the result notified from the frame error detecting section 311. If a frame error is detected, the base station increases the control target value SIRref by the predetermined value SIRinc (step 503). If no frame error is detected, the base station decreases the control target value SIRref by the different predetermined value SIRdec (step 504). If the control target value SIRref is larger than a maximum value SIRmax, the control target value SIRref is set to SIRmax (steps 505 and 506). If the control target value SIRref is smaller than a minimum value SIRmin, the control target value SIRref is set to SIRmin (steps 507 and 508). Step 502 is then repeated.

As for the mobile station 52, since the mobile station 52 has simultaneously established channels to the two base stations 21 and 22, a control station 61 updates the control target value. With regard to the mobile station 52, every time the reception circuit 303 receives a frame, each of the base stations 21 and 22 checks the presence/absence of an error by using a CRC code. Each base station then notifies the control station 61 of the result, together with transmission of a reception signal, through the reception circuit 303 and the reception circuit output terminal 306 connected to it.

Figure 7:
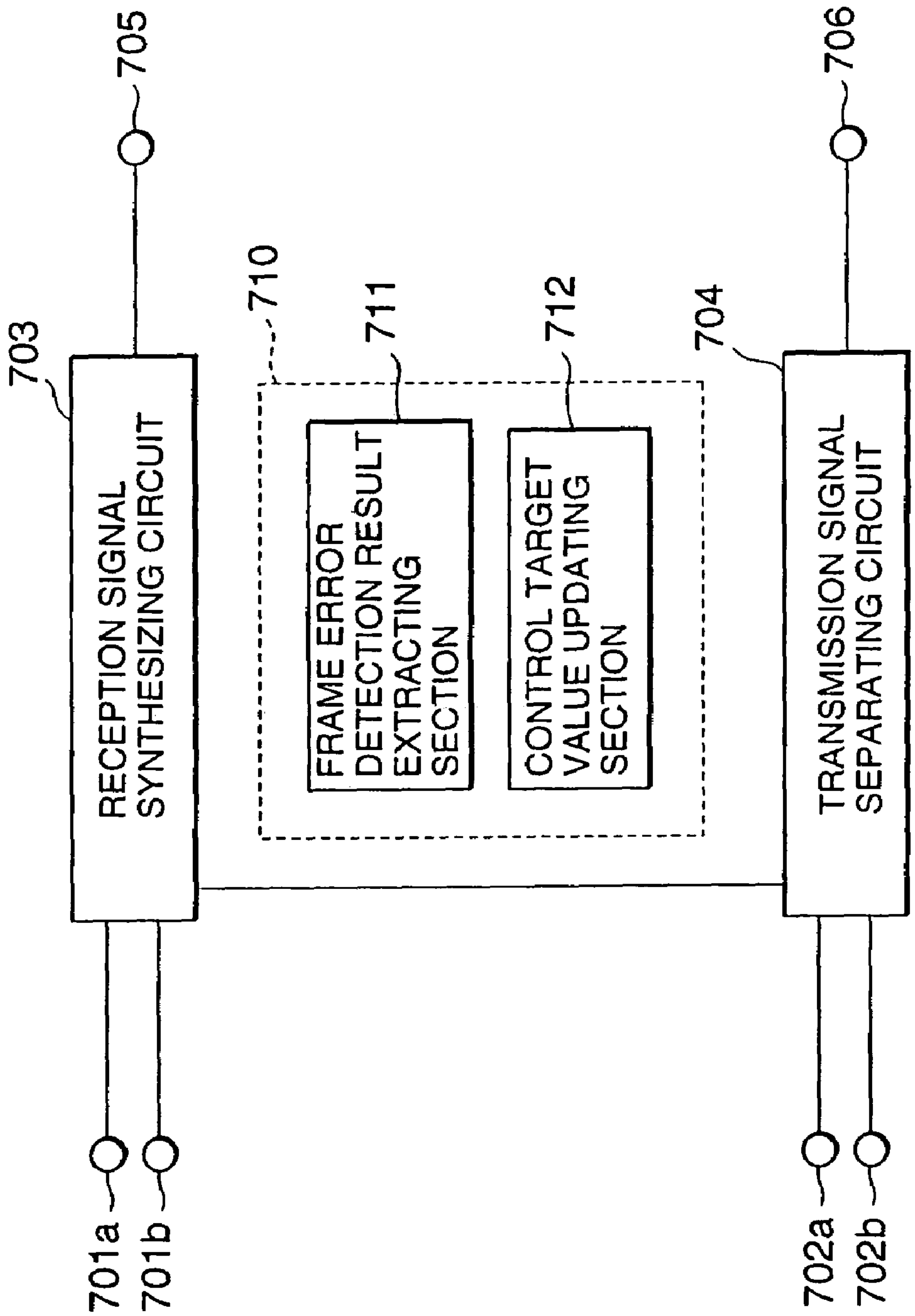
FIG. 7 is a view showing an example of the arrangement of a control station.

FIG. 7 shows an example of the arrangement of the control station 61. The control station 61 is comprised of base station input terminals 701*a* and 701*b*, base station output terminals 702*a* and 702*b*, reception signal synthesizing circuit 703, transmission signal separating circuit 704, host station output terminal 705, host station input terminal 706, and transmission power control apparatus 710. The transmission power control apparatus 710 is comprised of a frame error detection result extracting section 711 and control target value updating section 712.

The control station 61 receives reception signals transmitted from the mobile station 52 and the results obtained by checking the presence/absence of frame errors in the reception signals from the base stations 21 and 22 through the base station input terminals 701*a* and 701*b*. The reception signal synthesizing circuit 703 sends any frames, of the frames received from the base stations 21 and 22, in which no error is detected to a host station through the host station output terminal. In addition, the frame error detection result extracting section 711 is notified of the information indicating the presence/absence of a frame error which is received from each of the base stations 21 and 22. The frame error detection result extracting section 711 determines the presence/absence of a frame in which no error is detected, and notifies the control target value updating section 712 of the result.

If it is determined on the basis of the notified result that there is no frame in which no error is detected, the control target value updating section 712 increases the control target value. Otherwise, the control target value updating section 712 gradually decreases the control target value. In this case, when the control target value is to be gradually decreased, channel quality based on a frame error rate or the like is set as a channel quality target value.

Figure 8:
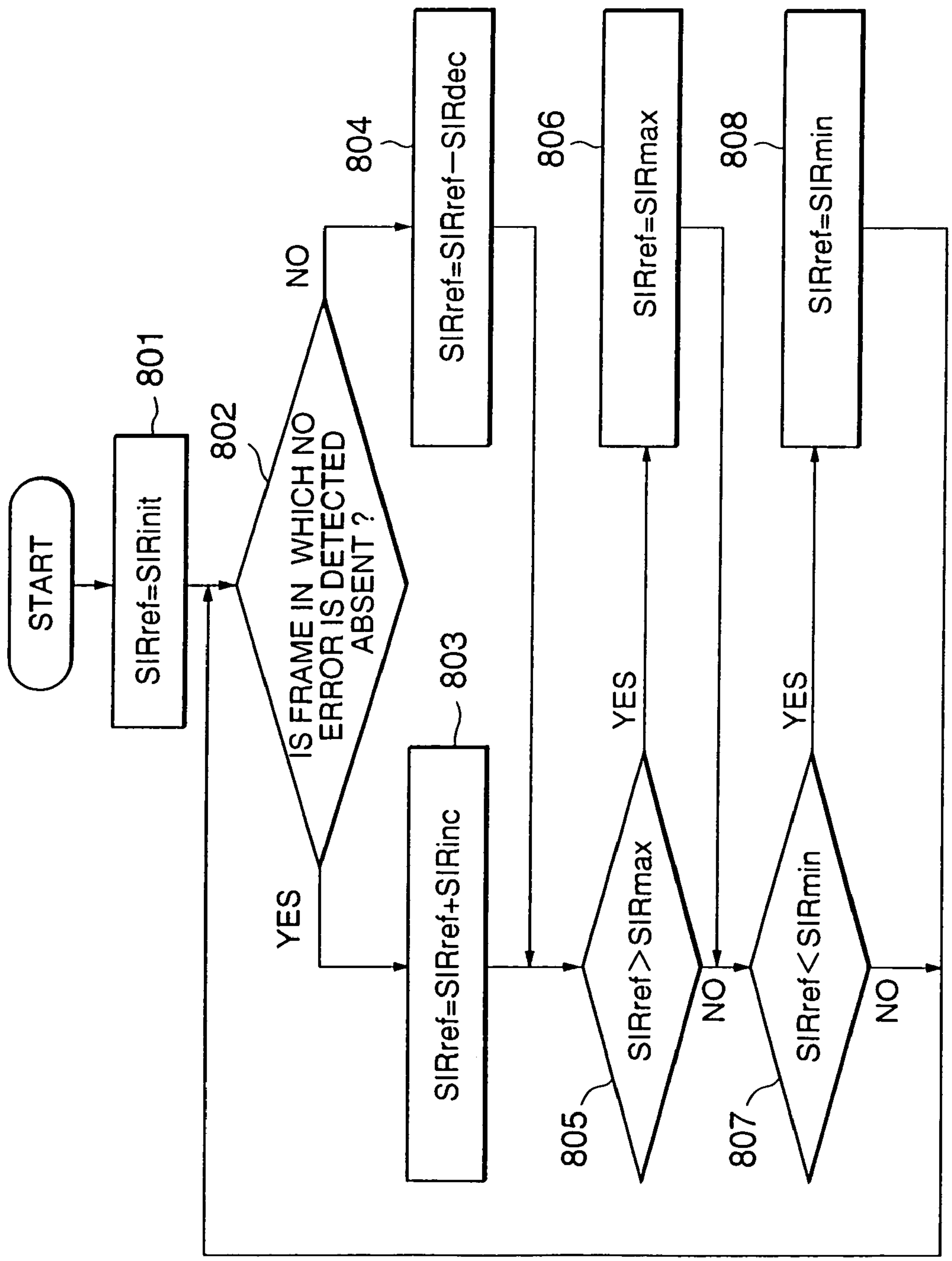
FIG. 8 is a flow chart showing a procedure for updating a control target value in the control station.

The manner of determining an increase and decrease in changing the control target value is the same as the manner of changing the control target value in each mobile station in the first embodiment. The operation of the control target value updating section 712 of the control station 61 can be explained with reference to the flow chart of FIG. 8.

When communication is started, the control station 61 sets the control target value SIRref to the initial value SIRinit (step 801). As SIRref, a control target value is set, which makes channel quality equal to a channel quality target value in an average propagation environment. Every time a frame of an upstream channel signal transmitted from a base station is received, the mobile station receives the result notified from the frame error detection result extracting section 711. If there is no frame in which no frame error is detected, the mobile station increases the control target value SIRref by the predetermined value SIRinc (step 803). If there is a frame in which no frame error is detected, the mobile station decreases the control target value SIRref by the different predetermined value SIRdec (step 804). If the control target value SIRref is larger than a maximum value SIRmax, the control target value SIRref is set to SIRmax (steps 805 and 806). If the control target value SIRref is smaller than a minimum value SIRmin, the control target value SIRref is set to SIRmin (steps 807 and 808). Step 802 is then repeated.

The transmission signal separating circuit 704 separates a transmission signal to be transmitted to a mobile station, which is received from the host station input terminal 706, into signals to be transmitted to the base stations 21 and 22, respectively. The transmission signal separating circuit 704 also adds the control target value updated by the control target value updating section 712 to the signals and transmits the resultant signals to the base stations 21 and 22, respectively.

According to the above control target value updating method in the base station and the above control target value updating method in the control station, even if the propagation environment abruptly changes, channel quality can be kept constant by keeping the frame error rate almost constant. In addition, the frame rate error can be matched to the channel quality target value. Furthermore, the frame error rate in each short time unit can be nearly matched to the channel quality target value. All the reasons for these are the same as those described in the first embodiment.

For transmission power control on an upstream or downstream channel, each of the embodiments descried above may use a method of determining a transmission power control instruction so as to keep signal power constant by measuring the signal power instead of measuring an SIR.

In the two embodiments described above, when a control target value for a mobile station that has established channels to a plurality of base stations is to be updated by a base station or control station, the functions assigned to the base station and control target value are not limited to those described here.

For example, each base station may check the presence/absence of a frame error in the frame error detecting section 311 and notify the control station of the result. The control station may check the presence/absence of a frame in which no error is detected in the frame error detection result extracting section 711 without updating the control target value, and notify each base station of the result. If the notified result indicates that there is no frame in which no error is detected, each base station may cause the control target value updating section 312 to increase the control target value. If there is a frame in which no error is detected, each base station may cause the control target value updating section 312 to decrease the control target value.

Each base station may check the presence/absence of a frame error in the frame error detecting section 311 and notify the control station of the result. The control station may cause the frame error detection result extracting section 711 to check the presence/absence of a frame in which no error is detected, without updating the control target value. If there is no frame in which no error is detected, the control station may notify each base station of the result. If each base station is notified of the result, each base station may cause the control target value updating section 312 to increase the control target value. Otherwise, each base station may cause the control target value updating section 312 to gradually decrease the control target value. According to this method, the amount of control information notified from the control station to each base station can be reduced.

Each base station may check the presence/absence of a frame error in the frame error detecting section 311 and notify the control station of the result. The control station may notify the respective base stations of all the results notified from the respective base stations. Each base station may cause the control target value updating section 312 to check the presence/absence of a frame in which no error is detected and increase the control target value if there is no frame in which no error is detected. If there is a frame in which no error is detected, each base station may cause the control target value updating section 312 to gradually decrease the control target value. In this case, each base station may receive results notified from all base stations other than the self-station instead of receiving the results notified from all the base stations.

Each base station may send a signal received from a mobile station to the control station without checking the presence/absence of a frame error. The control station may cause the reception signal synthesizing circuit 703 to perform diversity synthesis of reception signals sent from the respective base stations, and cause the frame error detection result extracting section 711 to check the presence/absence of a frame error in the synthesized signal. If a frame error is detected, the control station may cause the control target value updating section 712 to increase the control target value. Otherwise, the control station may cause the control target value updating section 712 to gradually decrease the control target value, and notify each base station of the updated control target value.

Each base station may send a signal received from a mobile station to the control station without checking the presence/absence of a frame error. The control station may cause the reception signal synthesizing circuit 703 to perform diversity synthesis of reception signals sent from the respective base stations, and cause the frame error detection result extracting section 711 to check the presence/absence of a frame error in the synthesized signal. The control station may notify each base station of the result. Each base station may cause the control target value updating section 312 to increase the control target value if a frame error is detected, and gradually decrease the control target value if no frame error is detected.

Each base station may send a signal received from a mobile station to the control station without checking the presence/absence of a frame error. The control station may cause the reception signal synthesizing circuit 703 to perform diversity synthesis of reception signals sent from the respective base stations, and cause the frame error detection result extracting section 711 to check the presence/absence of a frame error in the synthesized signal. If a frame error is detected, the control station may notify each base station of the result. Each base station may cause the control target value updating section 312 to increase the control target value if the result is notified, and gradually decrease the control target value if the result is not notified. According to this method, the amount of control information notified from the control station to each base station can be reduced.

The first and second embodiments described above have exemplified the case where the control station is used to update the control target value only for a mobile station that has established channels to a plurality of base stations. Even if, however, the control target value for a mobile station that has established a channel to only one base station is updated through the control station as in the case where the control target value for a mobile station that has established channels to a plurality of base stations, the present invention can be practiced without any problems.

The third embodiment will be described next.

A transmission power control method and transmission power control apparatus according to the third embodiment are implemented by the mobile communication system shown in FIG. 1 as in the first, embodiment. The same method as described above is used to establish channels between base stations and mobile stations. A mobile station 51 establishes a channel to a base station 21, whereas a mobile station 52 simultaneously establishes channels to the base station 21 and a base station 22. In addition, the slot and frame formats, error detection code adding method, and error correction encoding method are the same as those described above.

On the receiving side, every time the eight slots of each frame are received, the transmission power control instructions are removed, and the segmented data are extracted and merged. The merged data is then subjected to error correction decoding, and error detection is performed by using the CRC codes contained in the decoded data.

If no error is detected by a CRC code, the number of bits in error in a bit sequence before frame error correction decoding is checked. For this purpose, the bit sequence before error correction decoding is stored in a memory in advance. The same error correction encoding as that on the transmitting side is then performed again for the bit sequence having undergone error correction decoding. The resultant bit sequence is compared with the bit sequence stored in the memory to check the number of bits in error.

If an error is detected by a CRC code, the number of bits in error is treated as a predetermined number. This predetermined number is set as the number of bits in error which indicates the limit within which all errors can be corrected, in accordance with the error correcting ability of error correction encoding.

In this case, the number of bits in error is an amount reflecting channel quality. In order to keep channel quality high, the number of bits in error per frame is kept in a predetermined range. If no error is detected by a CRC code, all bit errors caused in the frame have been corrected. Assume that all the bit errors have been corrected. In this case, however, with channel quality in a state where the number of bits in error is large, many bit errors occur from a probabilistic viewpoint, and hence all the bit errors cannot always be corrected. As described above, the number of bits in error which are contained in a bit sequence before error correction decoding can be regarded as an index of channel quality. By keeping this to a desired value, desired channel quality can be kept. Therefore, keeping the number of bits in error before error correction decoding to a small value makes it possible to keep channel quality high and keep the probability of failure to correct bit errors very low without causing any bit errors that cannot be corrected by error correction decoding.

Each base station has the arrangement shown in FIG. 2 as in the first embodiment. This base station controls transmission power in accordance with an instruction to control the transmission power of a downstream channel from a mobile station, and also transmits an instruction to control the transmission power of an upstream channel to the mobile station.

Each mobile station has the arrangement shown in FIG. 3 as in the first embodiment. In this mobile station, a frame error detecting section 311 checks the number of bits in error in a frame by the method described above.

In this case, the frame error detecting section 311 of the mobile station 51 checks the number of bits in error in a frame of the signal which a reception circuit 303 has received from the base station 21. The frame error detecting section 311 of the mobile station 52 checks the number of bits in error in a frame of the signal obtained by the reception circuit 303 by diversity synthesis of signals from the base stations 21 and 22.

The frame error detecting section 311 then notifies a control target value updating section 312 of the number of bits in error. The control target value updating section 312 increases the control target value in accordance with the number of bits in error and also decreases the control target value in accordance with the number of bits not in error on the basis of the notified result.

In this case, an increase in control target value per bit in error and a decrease in control target value per bit not in error are related to each other such that channel quality based on a bit error rate or the like becomes a channel quality target value.

The control target value is therefore increased by a predetermined value SIRinc per bit in error, and decreased by another predetermined value SIRdec per bit not in error. The ratio of SIRinc to SIRdec is determined in accordance with a channel quality target value such as a desired bit error rate.

More specifically, the ratio of SIRinc to SIRdec is set to the reciprocal (1/Rtarget) of a desired bit error rate Rtarget. Therefore, SIRdec is the product (Rtarget× SIRinc) of the desired bit error rate and SIRinc. If the desired bit error rate is smaller than 0.1, the reciprocal is larger than 10, which is sufficiently larger than 1. Even if, therefore, the ratio of SIRinc to SIRdec is set to a value (1/Rtarget−1) smaller than the reciprocal of the desired frame rate error by one, SIRinc and SIRdec can be set in almost the same manner. This amounts to making the product (Rtarget×SIRinc) of the desired frame error rate and SIRinc equal to the product ((1−Rtarget)×SIRdec) of a value smaller than one by the desired bit error rate and SIRdec. In this case, SIRdec is equal to the product ({Rtarget/(1−Rtarget)}×SIRinc) of the ratio of the desired bit error rate to the value smaller than the desired bit error rate by one and SIRinc. Upper and lower limits are set for the control target value.

When the mobile station starts communication, the control target value updating section 312 of the mobile station sets a control target value SIRref to an initial value SIRinit. As SIRref, a control target value is set, which makes channel quality equal to a channel quality target value in an average propagation environment. Every time a frame of a downstream channel signal transmitted from a base station is received, the mobile station receives the result notified from the frame error detecting section 311, and increases the control target value SIRref by the product of the predetermined value SIRinc and the number of bits in error. The mobile station also decreases the control target value by the product of SIRdec and the number of bits not in error.

In the third embodiment, letting SIRinc be an increase in control target value per bit in error, SIRdec be a decrease in control target value per bit not in error, and Rtarget be a channel quality target value as a desired bit error rate, an increase and decrease per bit are determined as $$SIRdec=Rtarget\times SIRinc \quad (8)$$

or $$SIRdec=\{Rtarget/(1-Rtarget)\}\times SIRinc \quad (9)$$

If the number of frame errors in a number Mall of bits in a frame is represented by Merror, the number of bits not in error is given by Mall−Merror. Letting SIRtarget(i) be the control target value before updating, and SIRtarget(i+1) be the control target value after updating, $$SIRtarget(i+1)=SIRtarget(i)+Merror\times SIRinc\ (Mall-Merror)\times SIRdec \quad (10)$$

According to equations (8) and (10), $$SIRtarget(i+1)-SIRtarget(i)=SIRinc\times\{(1-Rtarget)\times Merror-Mall\times Rtarget) \quad (11)$$

If Rtarget is sufficiently smaller than 1, equation (11) can be approximated by $$SIRtarget(i+1)-SIRtarget(i)=SIRinc\times(Merror-Mall\times Rtarget) \quad (12)$$

According to equations (9) and (10), $$SIRtarget(i+1)-SIRtarget(i)=SIRinc\times(Merror-Mall\times Rtarget)/(1-Rtarget) \quad (13)$$

If the bit error rate in the frame is equal to the desired bit error rate, i.e., equation (14) is satisfied, both equations (12) and (13) become 0.

$$Rtarget=Merror/Mall \quad (14)$$

This indicates that if the bit error rate in a frame is equal to a desired bit error rate, the control target value is not changed. According to equations (12) and (13), the control target value is increased more as the bit error rate in a frame is higher than a desired bit error rate, and vice versa. This makes it possible to quickly bring a bit error rate near a desired bit error rate.

With the method of the third embodiment, therefore, even if the propagation environment changes during communication, the bit error rate during communication can be nearly matched to the channel quality target value based on a bit error rate.

In addition, this control target value is updated for each frame as in the first embodiment. If, therefore, the optimal control target value changes with a change in propagation environment, the control target value can be quickly changed to the optimal value, and the bit error rate corresponding to channel quality can be brought near a desired value as compared with the case where the control target value is updated upon measurement of a bit error rate over a plurality of frames.

The fourth embodiment is the same as the third embodiment in that a control target value is changed by using the number of bits in error, and is the same as the second embodiment in that the control target value is changed in a base station or control station. The fourth embodiment will be described below.

A transmission power control method and transmission power control apparatus according to the fourth embodiment are implemented by the mobile communication system shown in FIG. 1 as in the third embodiment. The same method as described above is used to establish channels between base stations and mobile stations. A mobile station 51 establishes a channel to a base station 21, whereas a mobile station 52 simultaneously establishes channels to the base station 21 and a base station 22. In addition, the slot and frame formats, error detection code adding method, and error correction encoding method are the same as those described above.

On the receiving side, as in the third embodiment, if no error is detected by a CRC code, the number of bits in error in a bit sequence before frame error decoding is checked. If an error is detected by a CRC code, the number of bits in error is treated as a predetermined number. This predetermined number is set as the number of bits in error which indicates the limit within which all errors can be corrected, in accordance with the error correcting ability of error correction encoding.

Keeping the number of bits in error before error correction decoding to a small value makes it possible to keep channel quality high and keep the probability of failure to correct bit errors very low without causing any bit errors that cannot be corrected by error correction decoding. As in the third embodiment, therefore, the number of bits in error per frame is kept in a predetermined range to keep channel quality high.

Like the base station in the second embodiment, each of the mobile stations 51 and 52 has the arrangement shown in FIG. 2, controls transmission power in according with an instruction to control the transmission power of an upstream channel from a base station, and transmits a instruction to control the transmission power of a downstream channel to the base station.

As in the second embodiment, each base station has the arrangement shown in FIG. 3, and a control station has the arrangement shown in FIG. 7. Each of the base station and control station has a transmission power control apparatus. Frame error detecting sections 311 and control target value updating sections 312 of the base stations 21 and 22 differ in their operations depending on whether a mobile station has established a channel to one base station or channels to a plurality of base stations. Updating of the control target value for a mobile station that has established a channel to one base station is performed by the base station. Updating of the control target value for a mobile station that has established channels to a plurality of base stations is performed by a control station to which these base stations are connected, and the respective base stations are notified of the resultant data. Each base station sets and uses the notified control target value. This operation is performed for the following reason. When a mobile station has established channels to a plurality of base stations, the channel quality of an upstream channel obtained by the control station by diversity synthesis of signals received by the base stations becomes actual channel quality between the mobile station and a remote station. Therefore, the channel quality improved by the diversity synthesis effect must be kept constant.

As for the mobile station 51, since the mobile station 51 has established a channel to only the base station 21, the control target value is updated by the mobile station 51. In the mobile station 51, every time a reception circuit 303 receives a frame, the frame error detecting section 311 checks the number of bits in error in the frame by the method described above.

The frame error detecting section 311 then notifies the control target value updating section 312 of the number of bits in error. The control target value updating section 312 increases the control target value in accordance with the number of bits in error on the basis of the notified result, and decreases the control target value in accordance with the number of bits not in error. In this case, an increase in control target value per bit in error and a decrease in control target value per bit not in error are related to each other such that channel quality based on a bit error rate or the like becomes a channel quality target value.

The manner of determining an increase and decrease in changing the control target value is the same as the manner of changing the control target value in each mobile station in the third embodiment.

When the base station starts communication, the control target value updating section 312 of the base station 21 for the mobile station 51 sets a control target value SIRref to an initial value SIRinit. As SIRref, a control target value is set, which makes channel quality equal to a channel quality target value in an average propagation environment. Every time a frame of an upstream channel signal transmitted from a mobile station is received, the base station receives the result notified from the frame error detecting section 311, and increases the control target value SIRref by the product of the predetermined value SIRinc and the number of bits in error. The base station also decreases the control target value by the product of SIRdec and the number of bits not in error.

As for the mobile station 52, since the mobile station 52 has simultaneously established channels to the two base stations 21 and 22, a control station 61 updates the control target value. For the mobile station 52, every time the reception circuit 303 of each of the base stations 21 and 22 receives a frame, the frame error detecting section 311 checks the number of bits in error by the method described above. The frame error detecting section 311 then notifies the control station 61, together with transmission of a reception signal, of the result through the reception circuit 303 and a reception circuit output terminal 306 connected to it.

The control station 61 receives the reception signal transmitted from the mobile station 52 and the numbers of bits in error in the frames from the mobile station 52 from the base stations 21 and 22 through base station input terminals 701*a* and 701*b*. If there is a frame in which no error is detected in the frames received from the base stations 21 and 22, a reception signal synthesizing circuit 703 sends the frame to a host station through a host station output terminal. A frame error detection result extracting section 711 is notified of the numbers of bits in error in the frames received from the base stations 21 and 22. The frame error detection result extracting section 711 checks the smallest number of the notified numbers of bits in error, and notifies a control target value updating section 712 of the result. The reason why the smallest number of bits in error is checked is that the number corresponds to a frame having the highest quality of the frames that are synthesized, i.e., the quality of the synthesized frame.

The control target value updating section 712 increases the control target value in accordance with the number of bits in error in the frame with the highest quality, and decreases the control target value in accordance with the number of bits not in error on the basis of the notified result. The manner of determining an increase per bit in error and a decrease per bit not in error is the same as the manner of changing the control target value in the base station in the fourth embodiment.

When the base station starts communication, the control target value updating section 712 of the control station 61 for the mobile station 52 sets the control target value SIRref to the initial value SIRinit. As SIRref, a control target value is set, which makes channel quality equal to a channel quality target value in an average propagation environment. When the smallest number of the numbers of bits in error notified from the frame error detection result extracting section 711 is notified, the control target value updating section 712 increases the control target value SIRref by the product of the predetermined value SIRinc and the number of bits in error, and decreases the control target value by the product of SIRdec and the number of bits not in error.

A transmission signal separating circuit 704 separates a transmission signal received from a host station input terminal 706 into signals to be transmitted to the base stations 21 and 22, respectively, and adds the control target value updated by the control target value updating section 712 to each signal. The transmission signal separating circuit 704 then transmits the resultant signals to the base stations 21 and 22 through base station output terminals 702*a* and 702*b*.

According to the above method of updating the control target value in the base station and the above method of updating the control target value in the control state, even if the propagation environment changes during communication, the bit error rate during communication can be nearly matched to a channel quality target value as a bit error rate. In addition, this control target value is updated for each frame as in the third embodiment. If, therefore, the optimal control target value changes with a change in propagation environment, the control target value can be quickly changed to the optimal value, and the bit error rate corresponding to channel quality can be brought near a desired value as compared with the case where the control target value is updated upon measurement of a bit error rate over a plurality of frames. All the reasons for these are the same as those described in the third embodiment.

In the fourth embodiment described above, when a control target value for a mobile station that has established channels to a plurality of base stations is to be updated by a base station or control station, the functions assigned to the base station and control target value are not limited to those described here.

For example, each base station may check the number of bits in error in a frame in the frame error detecting section 311 and notify the control station of the result. The control station may check the smallest number of the numbers of bits in error notified from the respective base stations in the frame error detection result extracting section 711 without updating the control target value, and notify each base station of the result. Each base station may cause the control target value updating section 312 to increase the control target value in accordance with the notified number of bits in error and gradually decrease the control target value in accordance with the number of bits not in error.

Each base station may check the number of bits in error in a frame in the frame error detecting section 311 and notify the control station of the result. The control station may notify each base station of the result notified from each base station. Each base station may cause the control target value updating section 312 to check the smallest number of the numbers of bits in error notified from the respective base stations, increase the control target value in accordance with the notified number of bits in error, and gradually decrease the control target value in accordance with the number of bits not in error. In this case, each base station may receive results notified from all base stations other than the self-station instead of receiving the results notified from all the base stations.

Each base station may send a signal received from a mobile station to the control station without checking the number of bits in error in a frame. The control station may cause the reception signal synthesizing circuit 703 to perform diversity synthesis of reception signals sent from the respective base stations, and cause the frame error detection result extracting section 711 to check the number of bits in error in the synthesized signal, increase the control target value in accordance with the number of bits in error, and decrease the control target value in accordance with the number of bits not in error. Each base station may be notified of the updated control target value.

Each base station may send a signal received from a mobile station to the control station without checking the number of bits in error in a frame. The control station may cause the reception signal synthesizing circuit 703 to perform diversity synthesis of reception signals sent from the respective base stations, and cause the frame error detection result extracting section 711 to check the number of bits in error in a fame of the synthesized signal. The control station may notify each base station of the result. Each base station may cause the control target value updating section 312 to increase the control target value in accordance with the number of bits in error, and gradually decrease the control target value in accordance with the number of bits not in error. Each base station may be notified of the updated control target value.

Each embodiment described above has exemplified the case where the control station is used to update the control target value only for a mobile station that has established channels to a plurality of base stations. Even if, however, the control target value for a mobile station that has established a channel to only one base station is updated through the control station as in the case where the control target value for a mobile station that has established channels to a plurality of base stations, the present invention can be practiced without any problems.

What is claimed is:

1. A transmission power control method characterized in that:

reception quality of a signal transmitted from a remote station is compared with a control target value, and the comparison result is used for the transmission power control on the remote stations; and it is checked whether a frame error exists in the received signal, the control target value is increased if a frame error is detected, and the control target value is gradually decreased if no frame error is detected.

2. A transmission control method characterized in that:

a channel is established between a mobile station and a base station, reception quality of a signal transmitted from the base station is compared with a control target value in the mobile station, and the comparison result is used for transmission power control on the base station; and the mobile station checks whether a frame error exists in the receive signal, increases the control target value if a frame error is detected, and gradually decreases the control target value if no frame error is detected.

3. A transmission control method characterized in that:

a channel is established between a mobile station and a base station, reception quality of a signal transmitted from the mobile station is compared with a control target value in the base station, and the comparison result is used for transmission power control on the mobile station; and the base station checks whether a frame error exists in the received signal, increases the control target value if a frame error is detected, and gradually decreases the control target value if no frame error is detected.

4. A transmission power control method characterized in that:

diversity synthesis of signals transmitted from one or a plurality of remote stations is performed, reception quality of a synthesized signal is compared with a control target value, and the comparison result is used for transmission power control on the one or the plurality of remote stations; and it is checked whether a frame error exists in the synthesized signal, the control target value is increased if a frame error is detected, and the control target value is gradually decreased if no frame error is detected.

5. A transmission power control method characterized in that:

a channel is established between a mobile station and one or a plurality of base stations, the mobile station performs diversity synthesis of signals transmitted from one or a plurality of base stations, reception quality of a synthesized signal is compared with a control target value, and the comparison result is used for transmission power control on the one or the plurality of base stations; and the mobile station checks whether a frame error exists in the received signal, increases the control target value if a frame error is detected, and gradually decreases the control target value if no frame error is detected.

6. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station;

each of the one or the plurality of base stations checks whether a frame error exists in the signal, and notifies a control station of the check result; and the control station uses the check result to determine the presence/absence of a frame in which no error is detected, increases the control target value if the determination result indicates that there is no frame in which no error is detected, gradually decreases the control target value if the determination result indicates that there is a frame in which no error is detected, and notifies each of the one or the plurality of base stations of the control target value after updating.

7. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station;

each of the one or the plurality of base stations checks whether a frame error exists in the signal, and notifies a control station of the check result;

the control station uses the check result to determine the presence/absence of a frame in which no error is detected, and notifies each of the one and the plurality of base stations of the determination result; and each of the one or the plurality of base stations increases the control target value if the notified determination result indicates that there is no frame in which no error is detected, and gradually decreases the control target value if the determination result indicates that there is a frame in which no error is detected.

8. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station;

each of the one or the plurality of base stations checks whether a frame error exists in the signal, and notifies a control station of the check result;

the control station determines, on the basis of the check result, the presence/absence of a frame in which no error is detected, and if there is no frame in which no error is detected, notifies each of the one or the plurality of base stations of the determination result; and each of the one or the plurality of base stations increases the control target value if it is notified of the determination result, and gradually decreases the control target value if it is not notified of the determination result.

9. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station;

each of the one or the plurality of base stations checks whether a frame error exists in the signal, and notifies a control station of the check result;

the control station notifies the one or the plurality of base stations of all check results notified from the one or the plurality of base stations or all check results except for a check result from a self-station; and each of the one or the plurality of base stations determines, on the basis of the check result, the presence/absence of a frame in which no error is detected, increases the control target value if there is no frame in which no error is detected, and gradually decreases the control target value if there is a frame in which no error is detected.

10. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station; and a control station performs diversity synthesis of signals received from the one or the plurality of base stations, checks whether a frame error exists in a synthesized signal, increases the control target value if a frame error is detected, and gradually decreases the control target value if no frame error is detected.

11. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station;

each of the one or the plurality of base stations sends a signal received from the mobile station to a control station;

the control station performs diversity synthesis of reception signals sent from the respective base stations, checks whether a frame error exists in the synthesized signal, and notifies each of the one or the plurality of base stations of the check result; and each of the one or the plurality of base stations increases the control target value if the check result indicates that a frame error is detected, and gradually decreases the control target value if no frame error is detected.

12. A transmission power control method characterized in that:

a channel is established between a mobile station and one or a plurality of base stations, reception quality of a signal transmitted from the mobile station is compared with a control target value in the one or the plurality of base stations, and the comparison result is used for transmission power control on the mobile station;

each of the one or the plurality of base stations sends a signal received from the mobile station to a control station;

the control station performs diversity synthesis of reception signals sent from each of the one or the plurality of base stations, checks whether a frame error exists in the synthesized signal, and if a frame error is detected, notifies each of the one or the plurality of base stations of the result; and each of the one or the plurality of base stations increases the control target value if the notification is received, and gradually decreases the control target value if the notification is not received.

13. A transmission power control method according to claim 1, characterized in that:

if a frame error is detected, the control target value is increased; and if no frame error is detected, the control target value is gradually decreased to match channel quality to a channel quality target value.

14. A transmission power control method according to claim 1, characterized in that:

if a frame error is detected, the control target value is increased; and if no frame error is detected, the control target value is gradually decreased to match a frame error rate to a channel quality target value.

15. A transmission power control method according to claim 1, characterized in that if a frame error is detected, the control target value is increased by a first predetermined value; and if no frame error is detected, the control target value is gradually decreased such that the control target value is decreased by the first predetermined value in an average time during which a frame error is detected when a frame error rate is set to a desired value.

16. A transmission power control method according to claim 1, characterized in that:

if a frame error is detected, the control target value is increased by a first predetermined value; and if no frame error is detected, the control target value is gradually decreased such that the control target value is decreased by the first predetermined value while frames fewer than a reciprocal of a channel quality target value based on a frame error rate by one are received.

17. A transmission power control method according to claim 1, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value.

18. A transmission power control method according to claim 1, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value based on a frame error rate.

19. A transmission power control method according to claim 1, characterized in that:

if a frame error is detected, the control target value is increased by a first predetermined value, and if no frame error is detected, the control target value is decreased by a second predetermined value; and a ratio of the first predetermined value to the second predetermined value is set to a reciprocal of a channel quality target value based on a frame error rate.

20. A transmission power control method according to claim 1, characterized in that:

if a frame error is detected, the control target value is increased by a first predetermined value, and if no frame error is detected, the control target value is decreased by a second predetermined value; and a ratio of the first predetermined value to the second predetermined value is set to a value smaller than a reciprocal of a channel quality target value based on a frame error rate by one.

21. A transmission power control method according to claim 1, characterized in that:

if a frame error is detected, the control target value is increased by a first predetermined value, and if no frame error is detected, the control target value is decreased by a second predetermined value; and a product of a channel quality target value based on a frame error rate and the first predetermined value is set as the second predetermined value.

22. A transmission power control method according to claim 1, characterized in that:

if a frame error is detected, the control target value is increased by a first predetermined value, and if no frame error is detected, the control target value is decreased by a second predetermined value; and a product of a channel quality target value based on a frame error rate and the first predetermined value is equal to a product of a value smaller than one by a channel quality target value based on a frame error rate and the second predetermined value.

23. A transmission power control apparatus characterized in that:

reception quality of a signal transmitted from a remote station is compared with a control target value, and the comparison result is used for transmission power control on the remote station; and it is checked whether a frame error exists in the signal, the control target value is increased if a frame error is detected, and the control target value is gradually decreased if no frame error is detected.

24. A transmission power control apparatus characterized in that:

diversity synthesis of signals transmitted from a plurality of remote stations is performed, reception quality of a synthesized signal is compared with a control target value, and the comparison result is used for transmission power control on the plurality of remote stations; and it is checked whether a frame error exists in the synthesized signal, the control target value is increased if a frame error is detected, and the control target value is gradually decreased if no frame error is detected.

25. A transmission power control apparatus according to claim 23, characterized in that:

if a frame error is detected, the control target value is increased, and if no frame error is detected, the control target value is gradually decreased to match channel quality to a channel quality target value.

26. A transmission power control apparatus according to claim 23, characterized in that:

if a frame error is detected, the control target value is increased; and if no frame error is detected, the control target value is gradually decreased to match a frame error rate to a channel quality target value.

27. A transmission power control apparatus according to claim 23, characterized in that:

if a frame error is detected, the control target value is increased by a first predetermined value, and if no frame error is detected, the control target value is gradually decreased such that the control target value is decreased by the first predetermined value in an average time during which a frame error is detected when a frame error rate is set to a desired value.

28. A transmission power control apparatus according to claim 23, characterized in that:

if a frame error is detected, the control target value is increased by a first predetermined value; and if no frame error is detected, the control target value is gradually decreased such that the control target value is decreased by the first predetermined value while frames fewer than a reciprocal of a channel quality target value based on a frame error rate by one are received.

29. A transmission power control apparatus according to claim 23, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value.

30. A transmission power control apparatus according to claim 23, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value based on a frame error rate.

31. A transmission power control apparatus according to claim 23, characterized in that:

if a frame error is detected, the control target value is increased by a first predetermined value, and if no frame error is detected, the control target value is decreased by a second predetermined value; and a ratio of the first predetermined value to the second predetermined value is set to a reciprocal of a channel quality target value based on a frame error rate.

32. A transmission power control apparatus according to claim 23, characterized in that:

if a frame error is detected, the control target value is increased by a first predetermined value, and if no frame error is detected, the control target value is decreased by a second predetermined value; and a ratio of the first predetermined value to the second predetermined value is set to a value smaller than a reciprocal of a channel quality target value based on a frame error rate by one.

33. A transmission power control apparatus according to claim 23, characterized in that:

if a frame error is detected, the control target value is increased by a first predetermined value, and if no frame error is detected, the control target value is decreased by a second predetermined value; and a product of a channel quality target value based on a frame error rate and the first predetermined value is set as the second predetermined value.

34. A transmission power control apparatus according to claim 23, characterized in that:

if a frame error is detected, the control target value is increased by a first predetermined value, and if no frame error is detected, the control target value is decreased by a second predetermined value; and a product of a channel quality target value based on a frame error rate and the first predetermined value is equal to a product of a value smaller than one by a channel quality target value based on a frame error rate and the second predetermined value.

35. A mobile station characterized in that:

reception quality of a signal transmitted from a base station is compared with a control target value, and the comparison result is used for transmission power control on the base station; and it is checked whether a frame error exists in the signal, the control target value is increased if a frame error is detected, and the control target value is gradually decreased if no frame error is detected.

36. A mobile station characterized in that:

diversity synthesis of signals transmitted from one or a plurality of base stations is performed, reception quality of a synthesized signal is compared with a control target value, and the comparison result is used for transmission power control on the one or the plurality of base stations; and it is checked whether a frame error exists in the synthesized signal, the control target value is increased if a frame error is detected, and the control target value is gradually decreased if no frame error is detected.

37. A mobile station according to claim 35, characterized in that if a frame error is detected, the control target value is increased, and if no frame error is detected, the control target value is gradually decreased to match channel quality to a channel quality target value.

38. A mobile station according to claim 35, characterized in that:

if a frame error is detected, the control target value is increased, and if no frame error is detected, the control target value is gradually decreased to match a frame error rate to a channel quality target value.

39. A mobile station according to claim 35, characterized in that:

if a frame error is detected, the control target value is increased by a first predetermined value; and if no frame error is detected, the control target value is gradually decreased such that the control target value is decreased by the first predetermined value in an average time during which a frame error is detected when a frame error rate is set to a desired value.

40. A mobile station according to claim 35, characterized in that:

if a frame error is detected, the control target value is increased by a first predetermined value; and if no frame error is detected, the control target value is gradually decreased such that the control target value is decreased by the first predetermined value while frames fewer than a reciprocal of a channel quality target value based on a frame error rate by one are received.

41. A mobile station according to claim 35, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value.

42. A mobile station according to claim 35, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value based on a frame error rate.

43. A mobile station according to claim 35, characterized in that:

if a frame error is detected, the control target value is increased by a first predetermined value, and if no frame error is detected, the control target value is decreased by a second predetermined value; and a ratio of the first predetermined value to the second predetermined value is set to a reciprocal of a channel quality target value based on a frame error rate.

44. A mobile station according to claim 35, characterized in that:

if a frame error is detected, the control target value is increased by a first predetermined value, and if no frame error is detected, the control target value is decreased by a second predetermined value; and a ratio of the first predetermined value to the second predetermined value is set to a value smaller than a reciprocal of a channel quality target value based on a frame error rate by one.

45. A mobile station according to claim 35, characterized in that:

if a frame error is detected, the control target value is increased by a first predetermined value, and if no frame error is detected, the control target value is decreased by a second predetermined value; and a product of a channel quality target value based on a frame error rate and the first predetermined value is set as the second predetermined value.

46. A mobile station according to claim 35, characterized in that:

if a frame error is detected, the control target value is increased by a first predetermined value, and if no frame error is detected, the control target value is decreased by a second predetermined value; and a product of a channel quality target value based on a frame error rate and the first predetermined value is equal to a product of a value smaller than one by a channel quality target value based on a frame error rate and the second predetermined value.

47. A base station characterized in that:

reception quality of a signal transmitted from a mobile station is compared with a control target value, and the comparison result is used for transmission power control on the mobile station; and it is checked whether a frame error exists in the signal, the control target value is increased if a frame error is detected, and the control target value is gradually decreased if no frame error is detected.

48. A base station characterized in that:

reception quality of a signal transmitted from a mobile station is compared with a control target value, and the comparison result is used for transmission power control on the mobile station;

It is checked whether a frame error exists in the signal, and a control station is notified of the check result; and the control station uses the check result to determine the presence/absence of a frame in which no error is detected, increases the control target value if there is no frame in which no error is detected, and gradually decreases the control target value if there is a frame in which no error is detected.

49. A base station characterized in that:

reception quality of a signal transmitted from a mobile station is compared with a control target value, and the comparison result is used for transmission power control on the mobile station;

it is checked whether a frame error exists in the signal, and a control station is notified of the check result; and a determination result on the presence/absence of a frame in which no error is detected, which is based on the check result, is received from the control station, the control target value is increased if the determination result indicates that there is no frame in which no error is detected, and the control target value is gradually decreased if the determination result indicates that there is a frame in which no error is detected.

50. A base station characterized in that:

reception quality of a signal transmitted from a mobile station is compared with a control target value, and the comparison result is used for transmission power control on the mobile station;

it is checked whether a frame error exists in the signal, and a control station is notified of the check result; and a determination result indicating that there is no frame in which no error is detected is received from the control station; and the control target value is increased if the base station is notified of the determination result, and the control target value is gradually decreased if the base station is notified of the determination result.

51. A base station characterized in that:

reception quality of a signal transmitted from a mobile station is compared with a control target value, and the comparison result is used for transmission power control on the mobile station;

it is checked whether a frame error exists in the signal, and a control station is notified of the check result;

all check results from the one or the plurality of base stations or all check results except for a check result from the self-station are received from the control station; and the presence/absence of a frame in which no error is detected is determined on the basis of the check results, the control target value is increased if there is no frame in which no error is detected and the control target value is gradually decreased if there is a frame in which no error is detected.

52. A base station characterized in that:

reception quality of a signal transmitted from a mobile station is compared with a control target value, and the comparison result is used for transmission power control on the mobile station;

the signal received from the mobile station is sent to a control station; and the control station checks whether a frame error exists in a signal obtained by diversity synthesis of reception signals sent from one or a plurality of base stations, the control target value is increased if a frame error is detected, the control target value is gradually decreased if no frame error is detected, and the updated control target value is received from the control station.

53. A base station characterized in that:

reception quality of a signal transmitted from a mobile station is compared with a control target value, and the comparison result is used for transmission power control on the mobile station;

the signal received from the mobile station is sent to a control station;

the control station checks whether a frame error exists in a signal obtained by diversity synthesis of reception signals sent from one or a plurality of base stations, and the check result is received from the control station; and the control target value is increased if the check result indicates that a frame error is detected, and the control target value is gradually decreased if the check result indicates that no frame error is detected.

54. A base station characterized in that:

reception quality of a signal transmitted from a mobile station is compared with a control target value, and the comparison result is used for transmission power control on the mobile station;

the signal received from the mobile station is sent to a control station;

the control station checks whether a frame error exists in a signal obtained by diversity synthesis of reception signals sent from one or a plurality of base stations, and a notification indicating that a frame error is detected is received from the control station; and the control target value is increased if the notification is received, and the control target value is gradually decreased if the notification is not received.

55. A base station according to claim 47, characterized in that:

if a frame error is detected, the control target value is increased; and if no frame error is detected, the control target value is gradually decreased to match channel quality to a channel quality target value.

56. A base station according to claim 47, characterized in that:

if a frame error is detected, the control target value is increased; and if no frame error is detected, the control target value is gradually decreased to match a frame error rate to a channel quality target value.

57. A base station according to claim 47, characterized in that:

if a frame error is detected, the control target value is increased by a first predetermined value; and if no frame error is detected, the control target value is gradually decreased such that the control target value is decreased by the first predetermined value in an average time during which a frame error is detected when a frame error rate is set to a desired value.

58. A base station according to claim 47, characterized in that:

if a frame error is detected, the control target value is increased by a first predetermined value; and if no frame error is detected, the control target value is gradually decreased such that the control target value is decreased by the first predetermined value while frames fewer than a reciprocal of a channel quality target value based on a frame error rate by one are received.

59. A base station according to claim 47, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value.

60. A base station according to claim 47, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value based on a frame error rate.

61. A base station according to claim 47, characterized in that:

if a frame error is detected, the control target value is increased by a first predetermined value, and if no frame error is detected, the control target value is decreased by a second predetermined value; and a ratio of the first predetermined value to the second predetermined value is set to a reciprocal of a channel quality target value based on a frame error rate.

62. A base station according to claim 47, characterized in that:

if a frame error is detected, the control target value is increased by a first predetermined value, and if no frame error is detected, the control target value is decreased by a second predetermined value; and a ratio of the first predetermined value to the second predetermined value is set to a value smaller than a reciprocal of a channel quality target value based on a frame error rate by one.

63. A base station according to claim 47, characterized in that:

if a frame error is detected, the control target value is increased by a first predetermined value, and if no frame error is detected, the control target value is decreased by a second predetermined value; and a product of a channel quality target value based on a frame error rate and the first predetermined value is set as the second predetermined value.

64. A base station according to claim 47, characterized in that:

if a frame error is detected, the control target value is increased by a first predetermined value, and if no frame error is detected, the control target value is decreased by a second predetermined value; and a product of a channel quality target value based on a frame error rate and the first predetermined value is equal to a product of a value smaller than one by a channel quality target value based on a frame error rate and the second predetermined value.

65. A control station characterized in that:

a check result indicating whether a frame error exists in a signal transmitted from a mobile station to one or a plurality of base stations is received from each of the one or the plurality of base stations; and the presence/absence of a frame in which no error is detected is determined on the basis of the check result, a control target value for controlling transmission power of the mobile station in the one or the plurality of base stations is increased if there is no frame in which no error is detected, and the control target value is gradually decreased if there is a frame in which no error is detected.

66. A control station characterized in that:

a check result indicating whether a frame error exists in a signal transmitted from a mobile station to one or a plurality of base stations is received from each of the one or the plurality of base stations; and the presence/absence of a frame in which no error is detected is determined on the basis of the check result, and the one or the plurality of base stations is notified of the determination result to increase a control target value for controlling transmission power of the mobile station in the one or the plurality of base stations if there is no frame in which no error is detected, and to gradually decrease the control target value if there is a frame in which no error is detected.

67. A control station characterized in that:

a check result indicating whether a frame error exists in a signal transmitted from a mobile station to one or a plurality of base stations is received from each of the one or the plurality of base stations;

the presence/absence of a frame in which no error is detected is determined on the basis of the check result, and if there is no frame in which no error is detected, each of the one or the plurality of base stations is notified of the determination result; and a control target value for controlling transmission power of the mobile station is increased if each of the one or the plurality of base stations is notified of the determination result, and the control target value is gradually decreased if the base station is not notified of the determination result.

68. A control station characterized in that:

a check result indicating whether a frame error exists in a signal transmitted from a mobile station to one or a plurality of base stations is received from each of the one or the plurality of base stations;

each of the one or the plurality of base stations is notified of all check results sent from the one or the plurality of base stations or all check results except for a check result from the self-station; and each of the one or the plurality of base stations is made to determine on the basis of the check result the presence/absence of a frame in which no error is detected, increase a control target value for controlling transmission power of the mobile station if there is no frame in which no error is detected, and gradually decrease the control target value if there is a frame in which no error is detected.

69. A control station characterized in that:

diversity synthesis of signals from a mobile station received by one or a plurality of base stations is performed; and it is checked whether a frame error exists in the synthesized signal, a control target value for controlling transmission power of the mobile station in the one or the plurality of base stations is increased if a frame error is detected, and the control target value is gradually decreased if no frame error is detected.

70. A control station characterized in that:

signals from a mobile station are received by one or a plurality of base stations;

diversity synthesis of reception signals sent from the one or the plurality of base stations is performed, it is checked whether a frame error exists in the synthesized signal, and the one or the plurality of base stations is notified of the check result; and a control target value for controlling transmission power of the mobile station which each of the one or the plurality of base stations has is increased if the check result indicates that a frame error is detected, and the control target value is gradually decreased if no frame error is detected.

71. A control station characterized in that:

signals from a mobile station are received by one or a plurality of base stations;

diversity synthesis of reception signals sent from the one or the plurality of base stations is performed, it is checked whether a frame error exists in the synthesized signal, and if a frame error is detected, the one or the plurality of base stations is notified of the result; and a control target value for controlling transmission power of the mobile station which each of the one or the plurality of base stations has is increased if the notification is received, and the control target value is gradually decreased if the notification is not received.

72. A control station according to claim 65, characterized in that:

if a frame error is detected, the control target value is increased; and if no frame error is detected, the control target value is gradually decreased to match channel quality to a channel quality target value.

73. A control station according to claim 65, characterized in that:

if a frame error is detected, the control target value is increased; and if no frame error is detected, the control target value is gradually decreased to match a frame error rate to a channel quality target value.

74. A control station according to claim 65, characterized in that:

if a frame error is detected, the control target value is increased by a first predetermined value; and if no frame error is detected, the control target value is gradually decreased such that the control target value is decreased by the first predetermined value in an average time during which a frame error is detected when a frame error rate is set to a desired value.

75. A control station according to claim 65, characterized in that:

if a frame error is detected, the control target value is increased by a first predetermined value; and if no frame error is detected, the control target value is gradually decreased such that the control target value is decreased by the first predetermined value while frames fewer than a reciprocal of a channel quality target value based on a frame error rate by one are received.

76. A control station according to claim 65, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value.

77. A control station according to claim 65, characterized in that:

if a frame error is detected, the control target value is increased by a first predetermined value, and if no frame error is detected, the control target value is decreased by a second predetermined value; and a ratio of the first predetermined value to the second predetermined value is determined in accordance with a channel quality target value based on a frame error rate.

78. A control station according to claim 65, characterized in that:

if a frame error is detected, the control target value is increased by a first predetermined value, and if no frame error is detected, the control target value is decreased by a second predetermined value; and a ratio of the first predetermined value to the second predetermined value is set to a reciprocal of a channel quality target value based on a frame error rate.

79. A control station according to claim 65, characterized in that:

if a frame error is detected, the control target value is increased by a first predetermined value, and if no frame error is detected, the control target value is decreased by a second predetermined value; and a ratio of the first predetermined value to the second predetermined value is set to a value smaller than a reciprocal of a channel quality target value based on a frame error rate by one.

80. A control station according to claim 65, characterized in that:

if a frame error is detected, the control target value is increased by a first predetermined value, and if no frame error is detected, the control target value is decreased by a second predetermined value; and a product of a channel quality target value based on a frame error rate and the first predetermined value is set as the second predetermined value.

81. A control station according to claim 65, characterized in that:

if a frame error is detected, the control target value is increased by a first predetermined value, and if no frame error is detected, the control target value is decreased by a second predetermined value; and a product of a channel quality target value based on a frame error rate and the first predetermined value is equal to a product of a value smaller than one by a channel quality target value based on a frame error rate and the second predetermined value.

82. A transmission power control method characterized in that:

a signal-to-interference ration of a signal transmitted from a remote station is compared with a signal-to-interference ratio reference value, every time a slot is received, and a control instruction is generated and transmitted to the remote station;

the remote station updates, every time a control instruction is received, transmission power in accordance with the control instruction, and every time a frame containing error detection information is received from the remote station, it is checked whether a frame error exists in the signal; and the signal-to-interference ratio reference value is increased by SIRinc if a frame error is detected, the signal-to-interference ratio reference value is decreased by SIRdec if no frame error is detected, and a product of a target value of a frame error rate and SIRinc is set as SIRdec.

83. A transmission power control method characterized in that:

a signal-to-interference ration of a signal transmitted from a remote station is compared with a signal-to-interference ratio reference value, every time a slot is received, and a control instruction is generated and transmitted to the remote station;

the remote station updates, every time a control instruction is received, transmission power in accordance with the control instruction, and every time a frame containing error detection information is received from the remote station, it is checked whether a frame error exists in the signal; and the signal-to-interference ration reference value is increased by SIRinc if a frame error is detected, the signal-to-interference ratio reference value is decreased by SIRdec if no frame error is detected, and a product of a ratio of a target value of a frame error rate to a value smaller than the target value of the frame error rate by one and SIRinc is set as SIRdec.

84. A transmission power control method according to claim 82, characterized in that upper and lower limits are set in a range in which the signal-to-interference ratio reference value is changed.

85. A transmission power control method according to claim 82, characterized in that error detection information is a Cyclic Redundancy Check code.

86. A transmission power control apparatus characterized in that:

a signal-to-interference ratio of a signal transmitted from a remote station is compared with a signal-to-interference ratio reference value, every time a slot is received, and a control instruction is generated and transmitted to the remote station;

every time a frame containing error detection information is received from the remote station, it is checked whether a frame error exists in the signal; and the signal-to-interference ration reference value is increased by SIRinc if a frame error is detected, the signal-to-interference ratio reference value is decreased by SIRdec if no frame error is detected, and a product of a target value of a frame error rate and SIRinc is set as SIRdec.

87. A transmission power control apparatus characterized in that:

a signal-to-interference ratio of a signal transmitted from a remote station is compared with a signal-to-interference ratio reference value, every time a slot is received, and a control instruction is generated and transmitted to the remote station, and every time a frame containing error detection information is received from the remote station, it is checked whether a frame error exists in the signal; and the signal-to-interference ratio reference value is increased by SIRinc if a frame error is detected, the signal-to-interference ratio reference value is decreased by SIRdec if no frame error is detected, and a product of a ratio of a target value of a frame error rate to a value smaller than the target value of the frame error rate by one and SIRinc is set as SIRdec.

88. A transmission power control apparatus according to claim 86, characterized in that upper and lower limits are set in a range in which the signal-to-interference ratio reference value is changed.

89. A transmission power control apparatus according to claim 86, characterized in that error detection information is a Cyclic Redundancy Check code.

90. A transmission power control method characterized in that:

reception quality of a signal transmitted from a remote station is compared with a control target value, the comparison result is used for transmission power control on the remote station, and the number of bits in error is checked; and the control target value is increased by a product of a predetermined value denoted as SIRinc and the number of bits in error and decreased by a product of another predetermined value denoted as SIRdec and a number of bits not in error wherein SIRdec is smaller than SIRinc.

91. A transmission power control method characterized in that:

reception quality of a signal transmitted from a mobile station is compared with a control target value, the comparison result is used for transmission power control on a base station, and the number of bits in error is checked; and the control target value is increased by a product of a predetermined value denoted as SIRinc and the number of bits in error and decreased by a product of another predetermined value denoted as SIRdec and a number of bits not in error, wherein SIRdec is smaller than SIRinc.

92. A transmission power control method characterized in that:

reception quality of a signal transmitted from a base station is compared with a control target value, the comparison result is used for transmission power control on a mobile station, and the number of bits in error is checked; and the control target value is increased by a product of a predetermined value denoted as SIRinc and the number of bits in error and decreased in by a product of another predetermined value denoted as SIRdec and a number of bits not in errors wherein SIRdec is smaller than SIRinc.

93. A transmission power control apparatus characterized in that:

reception quality of a signal transmitted from a remote station is compared with a control target value, the comparison result is used for transmission power control on the remote station, and the number of bits in error is checked; and the control target value is increased by a product of a predetermined value denoted as SIRinc and the number of bits in error and decreased by a product of another predetermined value denoted as SIRdec and a number of bits not in error, wherein SIRdec is smaller than SIRinc.

94. A mobile station characterized in that:

reception quality of a signal transmitted from a base station is compared with a control target value, the comparison result is used for transmission power control on the base station, and the number of bits in error is checked, and the control target value is increased by a product of a predetermined value denoted as SIRinc and the number of bits in error and decreased by a product of another predetermined value denoted as SIRdec and a number of bits not in error, wherein SIRdec is smaller than SIRinc.

95. A base station characterized in that:

reception quality of a signal transmitted from a mobile station is compared with a control target value, the comparison result is used for transmission power control on the mobile station, and the number of bits in error is checked, and the control target value is increased with by a product of a predetermined value denoted as SIRinc and the number of bits in error and decreased by a product of another predetermined value denoted as SIRdec and a number of bits not in error wherein SIRdec is smaller than SIRinc.

96. A control station characterized in that:

diversity synthesis of signals from a mobile station which are received by a plurality of base stations, and the number of bits in error in the synthesized signal is checked, and the control target value is increased by a product of a predetermined value denoted as SIRinc and the number of bits in error and decreased by a product of another predetermined value denoted as SIRdec and a number of bits not in error, wherein SIRdec is smaller than SIRinc.

97. A transmission power control method in a mobile communication system, characterized in that:

reception quality of a transmitted signal is compared with a predetermined control target value, and the comparison result is used for transmission power control on a remote station; and it is checked whether a frame error exist in the signal, the control target value is increased if a frame error is detected, and the control target value is decreased if no frame error is detected.

98. A transmission power control method in a mobile communication system, characterized in that:

reception quality of a transmitted signal is compared with a predetermined control target value, and the comparison result is used for transmission power control on a remote station; and it is checked whether a frame error exist in the signal, the control target value is increased if a frame error is detected, and the control target value is decreased if no frame error is detected.

* * * * *